(12) United States Patent
Nah et al.

(10) Patent No.: US 11,043,690 B2
(45) Date of Patent: Jun. 22, 2021

(54) SANDWICH-PARALLEL MICRO-BATTERY

(71) Applicant: International Business Machines Corporation, Armonk, NY (US)

(72) Inventors: Jae-Woong Nah, Closter, NJ (US); Paul S. Andry, Yorktown Heights, NY (US); Eric Peter Lewandowski, White Plains, NY (US); Bucknell C. Webb, Yorktown Heights, NY (US); Adinath Shantinath Narasgond, Yonkers, NY (US); Bo Wen, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 16/238,159

(22) Filed: Jan. 2, 2019

(65) Prior Publication Data
US 2020/0212475 A1    Jul. 2, 2020

(51) Int. Cl.
| | | |
|---|---|---|
| *H01M 10/04* | (2006.01) | |
| *H01M 4/505* | (2010.01) | |
| *H01M 4/66* | (2006.01) | |
| *H01M 2/02* | (2006.01) | |
| *H01M 50/116* | (2021.01) | |

(52) U.S. Cl.
CPC ....... *H01M 10/0436* (2013.01); *H01M 4/505* (2013.01); *H01M 4/661* (2013.01); *H01M 50/116* (2021.01)

(58) Field of Classification Search
None
See application file for complete search history.

(56) References Cited

U.S. PATENT DOCUMENTS

| | | | |
|---|---|---|---|
| 7,811,702 B2 | 10/2010 | Laurent et al. | |
| 9,287,532 B2 | 3/2016 | Delepierre et al. | |
| 9,312,561 B2 | 4/2016 | Oukassi et al. | |
| 9,876,200 B2 | 1/2018 | Andry et al. | |
| 2015/0188186 A1 | 7/2015 | Bedjaoui et al. | |
| 2017/0194607 A1* | 7/2017 | Andry | H01M 2/08 |
| 2017/0200923 A1 | 7/2017 | Weinstein et al. | |

FOREIGN PATENT DOCUMENTS

WO     2012037171 A2    3/2012

* cited by examiner

*Primary Examiner* — Christopher P Domone
(74) *Attorney, Agent, or Firm* — Amin, Turocy & Watson, LLP

(57) ABSTRACT

Systems and/or techniques associated with a sandwich-parallel micro-battery are provided. In one example, a device comprises a first battery and a second battery. The first battery comprises a first surface and a second surface. The second surface is smaller than the first surface. The second battery comprises a third surface and a fourth surface. The fourth surface is smaller than the third surface. Furthermore, the fourth surface is mechanically coupled to the second surface of the first battery. The third surface of the second battery and the first surface of the first battery comprise a conductive contact that electrically couples the first battery and the second battery.

5 Claims, 20 Drawing Sheets

FROM FIG. 8B

FROM FIG. 9B

SANDWICH-PARALLEL MICRO-BATTERY

BACKGROUND

The subject disclosure relates to micro-battery systems, and more specifically, to micro-battery package integration and/or prototyping.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, methods, apparatuses and/or devices that facilitate a sandwich-parallel micro-battery are described.

According to an embodiment, a device can comprise a first battery and a second battery. The first battery can comprise a first surface and a second surface. The second surface can be smaller than the first surface. The second battery can comprise a third surface and a fourth surface. The fourth surface can be smaller than the third surface. The fourth surface can be mechanically coupled to the second surface of the first battery. The third surface of the second battery and the first surface of the first battery can comprise a conductive contact that electrically couples the first battery and the second battery.

According to another embodiment, a method is provided. The method can comprise bonding a first substrate associated with a paste material to a second substrate associated with a hydrogel material to form a first micro-battery that comprises a first surface and a second surface, where the second surface is smaller than the first surface. Furthermore, the method can comprise bonding the second surface of the first micro-battery to a third surface of a second micro-battery, where the third surface is smaller than a fourth surface of the second micro-battery.

According to yet another embodiment, a micro-battery device can comprise a first flexible micro-battery and a second flexible micro-battery. The first flexible micro-battery can comprise a first surface and a second surface. The second surface can be smaller than the first surface. The second flexible micro-battery can comprise a third surface and a fourth surface. The fourth surface can be smaller than the third surface. The fourth surface can be mechanically coupled to the second surface of the first flexible micro-battery.

DETAILED DESCRIPTION

Figure 1:
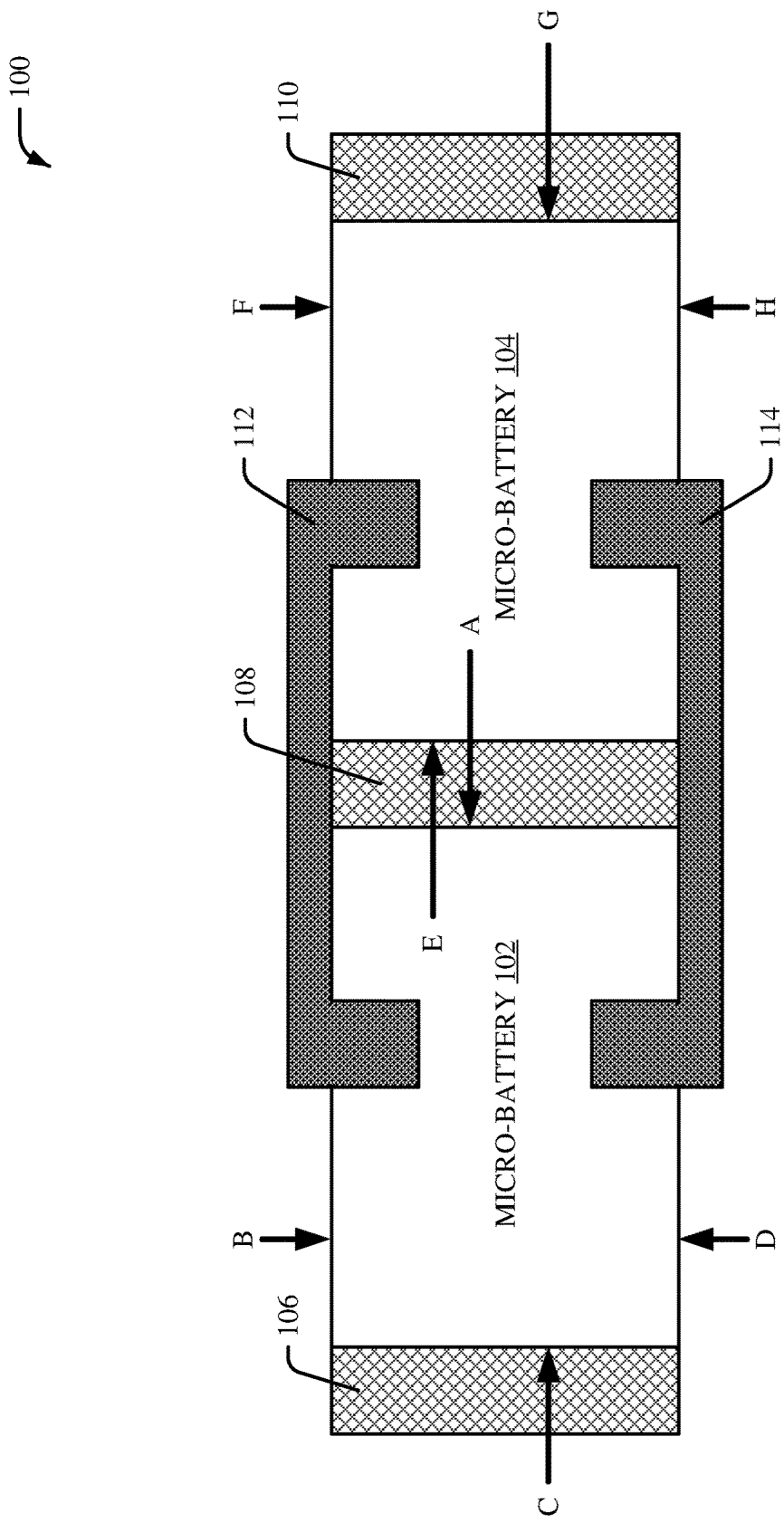
FIG. 1 illustrates an example, non-limiting device in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A micro-battery can be used in a variety of applications that require reduced battery size with increased energy density, such as, for example, in microelectronic applications. In certain applications, a flexible micro-battery with a flexible film can be employed. However, a micro-battery generally comprises voltage limitations and/or limited power capacity. Furthermore, fabrication cost for a micro-battery can be expensive. Moreover, packaging of a large quantity of micro-batteries to facilitate fabrication of micro-batteries is often difficult and/or time consuming. As such, an improved micro-battery and/or an improved micro-battery system is desirable.

Embodiments described herein include systems, methods, apparatuses and devices that facilitate a sandwich-parallel micro-battery. For example, a novel micro-battery and/or a novel micro-battery packaging can be provided. The sandwich-parallel micro-battery can be, for example, a sandwich-parallel bio comparable micro-battery. In an aspect, the sandwich-parallel micro-battery can include one or more flexible micro-batteries. The one or more flexible micro-batteries can be sealed on one or more sides of the flexible micro-batteries. For instance, four sides of the flexible micro-batteries can be sealed. The flexible micro-batteries can also be fabricated on a flexible material. In certain embodiments, an assembly of flexible micro-batteries can be cut into individual flexible micro-batteries. For examples an anode side panel and a cathode side panel for the assembly of flexible micro-batteries can be cut into individual flexible micro-batteries. In an embodiment, two or more flexible micro-batteries can be stacked in a vertical, three-dimensional direction. In another embodiment, two or more flexible micro-batteries can be connected in a horizonal, two-dimensional direction. In certain embodiments, the one or more flexible micro-batteries can include a backside contact to facilitate an electrical connection. In certain embodiments, the one or more flexible micro-batteries can form a metal sealed structure. As such, a micro-battery with improved voltage characteristics can be provided. For example, a micro-battery with a higher voltage (e.g., approximately 3V or higher) as compared to a conventional micro-battery can be provided. Furthermore, a micro-battery can be stacked and/or connected to one or more other micro-batteries for increased power capacity and/or increased voltage. Cost for fabricating a micro-battery can also be reduced. Moreover, performance of a micro-battery can be improved.

FIG. 1 illustrates an example, non-limiting device 100 in accordance with one or more embodiments described herein. The device 100 can be a micro-battery device. For instance, the device 100 can be a sandwich-parallel micro-battery. In one example, the device 100 can be a sandwich-parallel bio comparable micro-battery. Furthermore, the device 100 can be a novel micro-battery device and/or a novel micro-battery packaging that is highly technical in nature, that is not abstract and that cannot be created by a set of mental acts by a human. Further, the device 100 can be employed to solve new problems that arise through advancements in technology such as, for example, micro-battery technologies, micro-battery packaging technologies, micro-battery package integration technologies, micro-battery prototyping technologies, circuit technologies, and/or computer architecture, and the like. One or more embodiments of the device 100 can provide technical improvements to a micro-battery by at least improving quality of a micro-battery, improving performance of a micro-battery, improving voltage characteristics of a micro-battery, increasing power capacity of a micro-battery, increasing voltage capability of a micro-battery, reducing cost for fabricating a micro-battery, providing a batch process that enables mass production of micro-batteries, and/or one or more other technical improvements associated with a micro-battery.

In the embodiment shown in FIG. 1, the device 100 can include a micro-battery 102 and a micro-battery 104. The micro-battery 102 can include one or more flexible substrates, one or more adhesive layers, one or more core layers, one or more conductive layers, hydrogel material and/or paste material. For instance, the micro-battery 102 can include a flexible substrate and an anode material associated with a first conductive layer. The micro-battery 102 can also include a hydrogel material between the anode material and a cathode material associated with a second conductive layer. The hydrogel material can be deposited on the first conductive layer. The cathode material can be, for example, the paste material. In an aspect, the paste material can be deposited on the second conductive layer. The paste material can be a manganese dioxide paste material, a carbon paste material, a zinc chloride paste material or another type of paste material. Additionally, the micro-battery 104 can include one or more flexible substrates, one or more adhesive layers, one or more core layers, one or more conductive layers, hydrogel material and/or paste material. For instance, the micro-battery 104 can include a flexible substrate and an anode material associated with a first conductive layer. The micro-battery 104 can also include a hydrogel material between the anode material and a cathode material associated with a second conductive layer. The hydrogel material can be deposited on the first conductive layer. The cathode material can be, for example, the paste material. In an aspect, the paste material can be deposited on the second conductive layer. The paste material can be a manganese dioxide paste material, a carbon paste material, a zinc chloride paste material or another type of paste material.

In an aspect, the micro-battery 102 can include a surface A, a surface B, a surface C and a surface D. The surface A of the micro-battery 102 can be smaller than the surface B and the surface D. Furthermore, the surface C of the micro-battery 102 can also be smaller than the surface B and the surface D. In another aspect, the micro-battery 104 can include a surface E, a surface F, a surface G and a surface H. The surface E of the micro-battery 104 can be smaller than the surface F and the surface H. Furthermore, the surface G of the micro-battery 104 can also be smaller than the surface F and the surface H. In an embodiment, the micro-battery 102 and the micro-battery 104 can form a two-dimensional connection. For instance, the micro-battery 102 and the micro-battery 104 can be connected in a horizontal, two-dimensional direction. In an example, the surface A of the micro-battery 102 can be mechanically coupled to the surface E of the micro-battery 104. In certain embodiments, a coating 106 can be formed on the surface C of the micro-battery 102. In one example, the coating 106 can be a metal coating. In another example, the coating 106 can be a polymer coating. Additionally or alternatively, a coating 108 can be formed on the surface A of the micro-battery 102 and/or the surface E of the micro-battery 104. In one example, the coating 108 can be a metal coating. In another example, the coating 108 can be a polymer coating. Additionally or alternatively, a coating 110 can be formed on the surface G of the micro-battery 104. In one example, the coating 110 can be a metal coating. In another example, the coating 110 can be a polymer coating. In certain embodiments, a coating such as a metal coating and/or a polymer coating can additionally or alternatively be formed on the surface B of the micro-battery 102, the surface D of the micro-battery 102, the surface F of the micro-battery 104 and/or the surface H of the micro-battery 104. In another embodiment, a conductive contact 112 and/or a conductive contact 114 can electrically couple the micro-battery 102 and the micro-battery 104. The conductive contact 112 can be a metal contact such as, for example, a zinc contact, a titanium contact, a copper contact or another metal contact. Furthermore, the conductive contact 114 can be a metal contact such as, for example, a zinc contact, a titanium contact, a copper contact or another metal contact. In an aspect, the conductive contact 112 can be a backside contact formed using a through hole. Furthermore, the conductive contact 114 can be another backside contact formed using a through hole.

Figure 2:
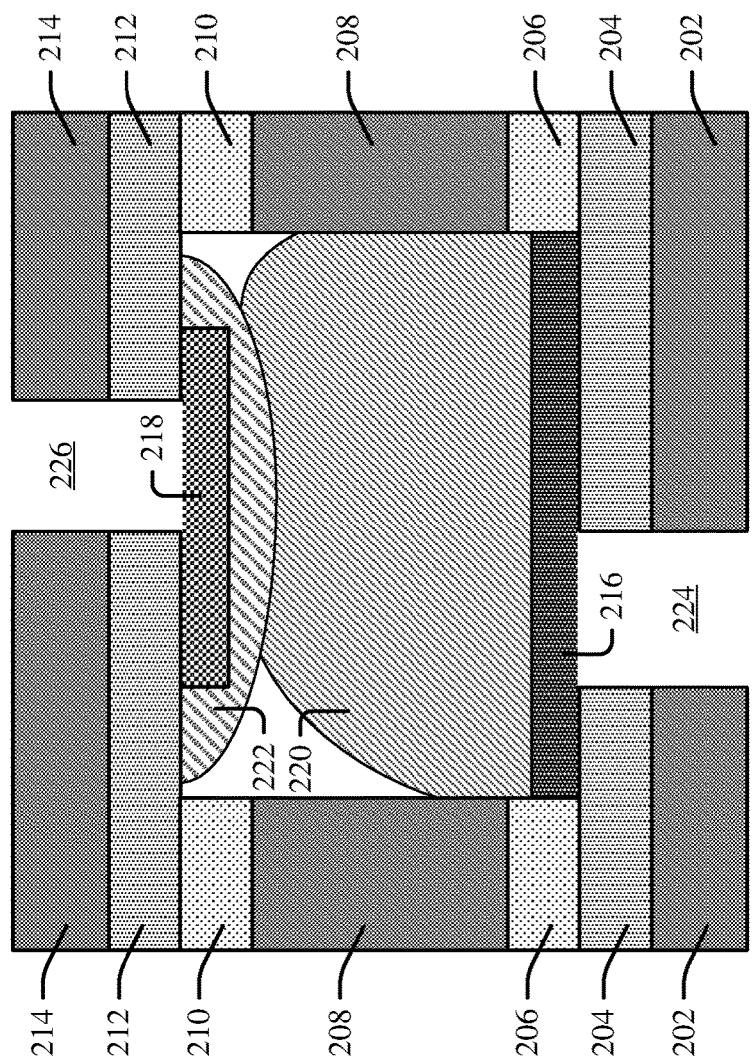
FIG. 2 illustrates another example, non-limiting device in accordance with one or more embodiments described herein.

FIG. 2 illustrates a cross sectional view of an example, non-limiting device 200 in accordance with one or more embodiments described herein. Repetitive description of like elements employed in other embodiments described herein is omitted for sake of brevity.

The device 200 can be, for example, a micro-battery. For instance, the device 200 can correspond to the micro-battery 102 and/or the micro-battery 104. The device 200 can include a substrate 202, a curable adhesive layer 204, an adhesive layer 206, a core layer 208, an adhesive layer 210, a curable adhesive layer 212 and/or a substrate 214. The substrate 202 can be, for example, a flexible substrate. For example, the substrate 202 can be a flexible plastic substrate, a flexible glass substrate, or a flexible silicon substrate. In one example, the substrate 202 can be an ultraviolet transparent flexible substrate. The curable adhesive layer 204 can be, for example, a pressure-sensitive adhesive, a light-curable adhesive or a heat-curable adhesive. The adhesive layer 206 can be, for example, a pressure-sensitive adhesive, a light-curable adhesive or a heat-curable adhesive. In an embodiment, the adhesive layer 206 can be a different type of adhesive than the curable adhesive layer 204. In another embodiment, the adhesive layer 206 can correspond to the curable adhesive layer 204. In certain embodiments, the adhesive layer 206 can include polyvinyl chloride, polyolefin, polyethylene or another adhesive material. The core layer 208 can be, for example, a flexible substrate. For example, the core layer 208 can be a flexible plastic substrate, a flexible glass substrate, or a flexible silicon substrate. Alternatively, the core layer 208 can be a metal core layer within, for example, an insulated surface. The adhesive layer 210 can be, for example, a pressure-sensitive adhesive, a light-curable adhesive or a heat-curable adhesive. The curable adhesive layer 212 can be, for example, a pressure-sensitive adhesive, a light-curable adhesive or a heat-curable adhesive. In an embodiment, the adhesive layer 210 can be a different type of adhesive than the curable adhesive layer 212. In another embodiment, the adhesive layer 210 can correspond to the curable adhesive layer 212. In certain embodiments, the adhesive layer 210 can include polyvinyl chloride, polyolefin, polyethylene or another adhesive material. The substrate 214 can be, for example, a flexible substrate. For example, the substrate 214 can be a flexible plastic substrate, a flexible glass substrate, or a flexible silicon substrate. In one example, the substrate 214 can be an ultraviolet transparent flexible substrate.

Additionally, the device 200 can include a conductive layer 216, a conductive layer 218, paste material 220 and/or hydrogel material 222. The conductive layer 216 can be a metal layer. For instance, the conductive layer 216 can be a titanium layer or another type of metal. In one example, the conductive layer 216 can be a titanium foil layer. The conductive layer 218 can be a metal layer. The conductive layer 218 can be a different type of metal than the conductive layer 216. For instance, the conductive layer 218 can be a zinc layer or another type of metal. In one example, the conductive layer 216 can be a zinc foil layer. However, in certain embodiments, metal of the conductive layer 216 can correspond to metal of the conductive layer 218. The paste material 220 can be a curing paste. Furthermore, the paste material 220 can serve as a cathode for the device 200. For instance, the paste material 220 can be a cathode material. In one example, the paste material 220 can be a manganese dioxide paste. In another example, the paste material 220 can be a carbon paste. In yet another example, the paste material 220 can be a zinc chloride paste. However, it is to be appreciated that the paste material 220 can be a different type of cathode paste material. In an aspect, the paste material 220 can be deposited onto the conductive layer 216. The hydrogel material 222 can be a liquid and/or a gel that comprises one or more polymeric materials. For example, the hydrogel material 222 can be water-soluble polymer (e.g., a cellulose ether) such as a water-soluble methylcellulose polymer, a water-soluble hydroxypropyl methylcellulose polymer, or another type of water-soluble polymer. In another example, the hydrogel material 222 can be a photo-initiated and/or an ultraviolet light-initiated gel such as Polyethylene (glycol) Diacrylate. In yet another example, the hydrogel material 222 can be a zinc chloride hydrogel. However, it is to be appreciated that the hydrogel material 222 can be a different type of hydrogel material. In an aspect, the hydrogel material 222 can be deposited onto the conductive layer 218. In an aspect, the conductive layer 218 can serve as an anode for the device 200. For example, the conductive layer 218 can be an anode material. In certain embodiments, the device 200 can additionally include an opening 224 and/or an opening 226. For example, the opening 224 can be an opening to the conductive layer 216. Furthermore, the opening 226 can be an opening to the conductive layer 218.

Figure 3:
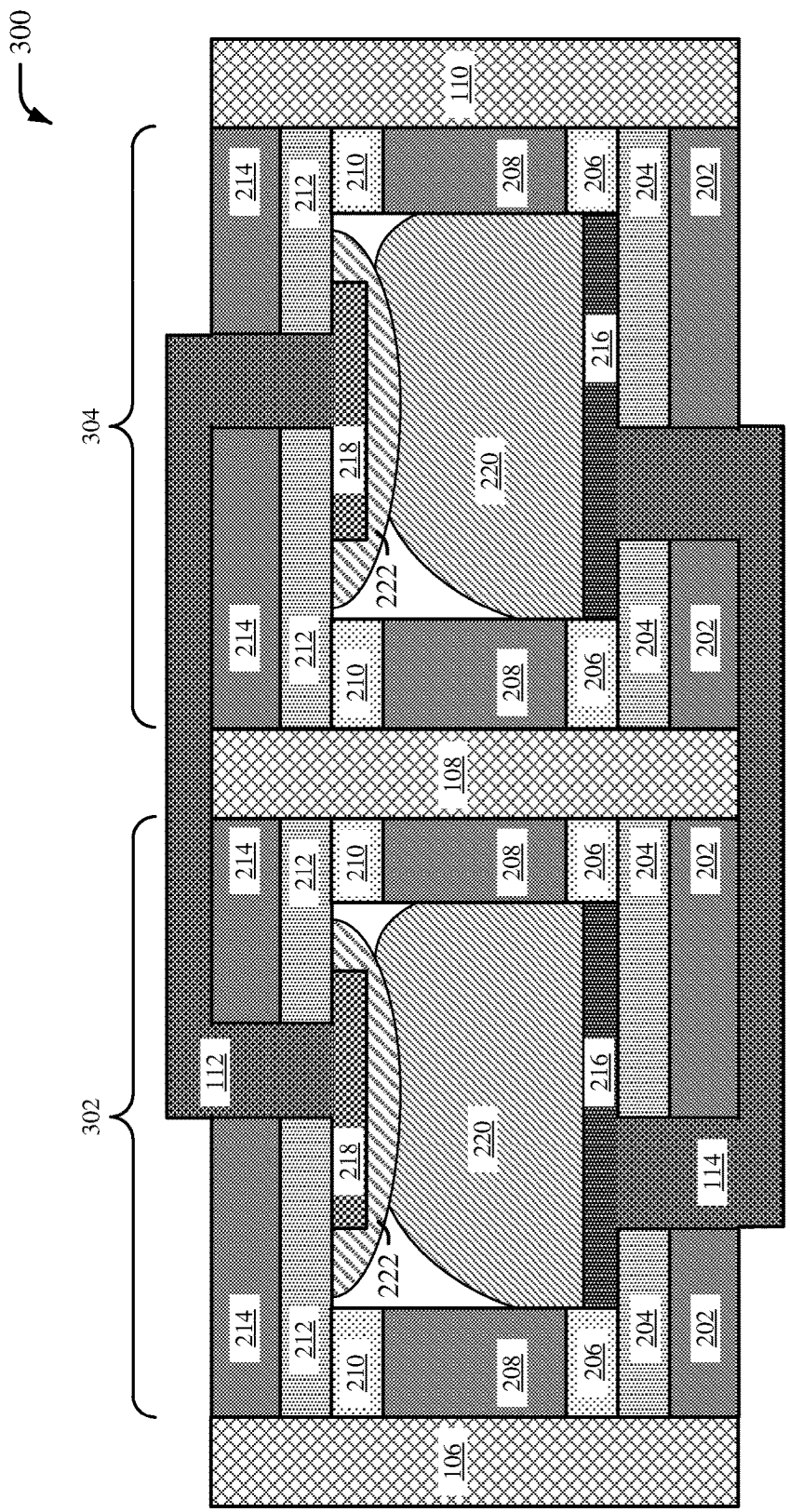
FIG. 3 illustrates yet another example, non-limiting device in accordance with one or more embodiments described herein.

FIG. 3 illustrates a cross sectional view of an example, non-limiting device 300 in accordance with one or more embodiments described herein. Repetitive description of like elements employed in other embodiments described herein is omitted for sake of brevity.

The device 300 can be a micro-battery device. For instance, the device 300 can be a sandwich-parallel micro-battery. In one example, the device 300 can be a sandwich-parallel bio comparable micro-battery. In an embodiment, the device 300 can be an alternate embodiment of the device 100. The device 300 can include a micro-battery 302 and a micro-battery 304. The micro-battery 302 and/or the micro-battery 304 can, for example, correspond to the device 200. Additionally or alternatively, the micro-battery 302 can correspond to the micro-battery 102 and/or the micro-battery 304 can correspond to the micro-battery 104. The micro-battery 302 can include the substrate 202, the curable adhesive layer 204, the adhesive layer 206, the core layer 208, the adhesive layer 210, the curable adhesive layer 212, the substrate 214, the conductive layer 216, the conductive layer 218, the paste material 220 and/or the hydrogel material 222. Additionally, the micro-battery 304 can include the substrate 202, the curable adhesive layer 204, the adhesive layer 206, the core layer 208, the adhesive layer 210, the curable adhesive layer 212, the substrate 214, the conductive layer 216, the conductive layer 218, the paste material 220 and/or the hydrogel material 222.

In an embodiment, the conductive contact 112 can electrically couple the micro-battery 302 and the micro-battery 304. For instance, the conductive contact 112 can electrically couple the conductive layer 218 of the micro-battery 302 and the conductive layer 218 of the micro-battery 304. Additionally or alternatively, the conductive contact 114 can electrically couple the micro-battery 302 and the micro-battery 304. For instance, the conductive contact 114 can electrically couple the conductive layer 216 of the micro-battery 302 and the conductive layer 216 of the micro-battery 304. In an aspect, the conductive contact 112 can be a backside contact formed using a through hole associated with the opening 226. Furthermore, the conductive contact 114 can be another backside contact formed using a through hole associated with the opening 224. In another aspect, the micro-battery 302 and the micro-battery 304 can form a two-dimensional connection. For instance, the micro-battery 302 and the micro-battery 304 can be connected in a horizontal, two-dimensional direction. In certain embodiments, the coating 106 can be formed on a surface of the micro-battery 302. For instance, the coating 106 can be formed on a surface of the substrate 202, the curable adhesive layer 204, the adhesive layer 206, the core layer 208, the adhesive layer 210, the curable adhesive layer 212, and/or the substrate 214 associated with the micro-battery 302. Additionally or alternatively, the coating 108 can be formed on another surface of the micro-battery 302 and/or on a surface of the micro-battery 304. For instance, the coating 108 can be formed on another surface of the substrate 202, the curable adhesive layer 204, the adhesive layer 206, the core layer 208, the adhesive layer 210, the curable adhesive layer 212, and/or the substrate 214 associated with the micro-battery 302. Furthermore, the coating 108 can be formed on a surface of the substrate 202, the curable adhesive layer 204, the adhesive layer 206, the core layer 208, the adhesive layer 210, the curable adhesive layer 212, and/or the substrate 214 associated with the micro-battery 304. Additionally or alternatively, the coating 110 can be formed on another surface of the micro-battery 304. For instance, the coating 106 can be formed on another surface of the substrate 202, the curable adhesive layer 204, the adhesive layer 206, the core layer 208, the adhesive layer 210, the curable adhesive layer 212, and/or the substrate 214 associated with the micro-battery 304.

Figure 4A:
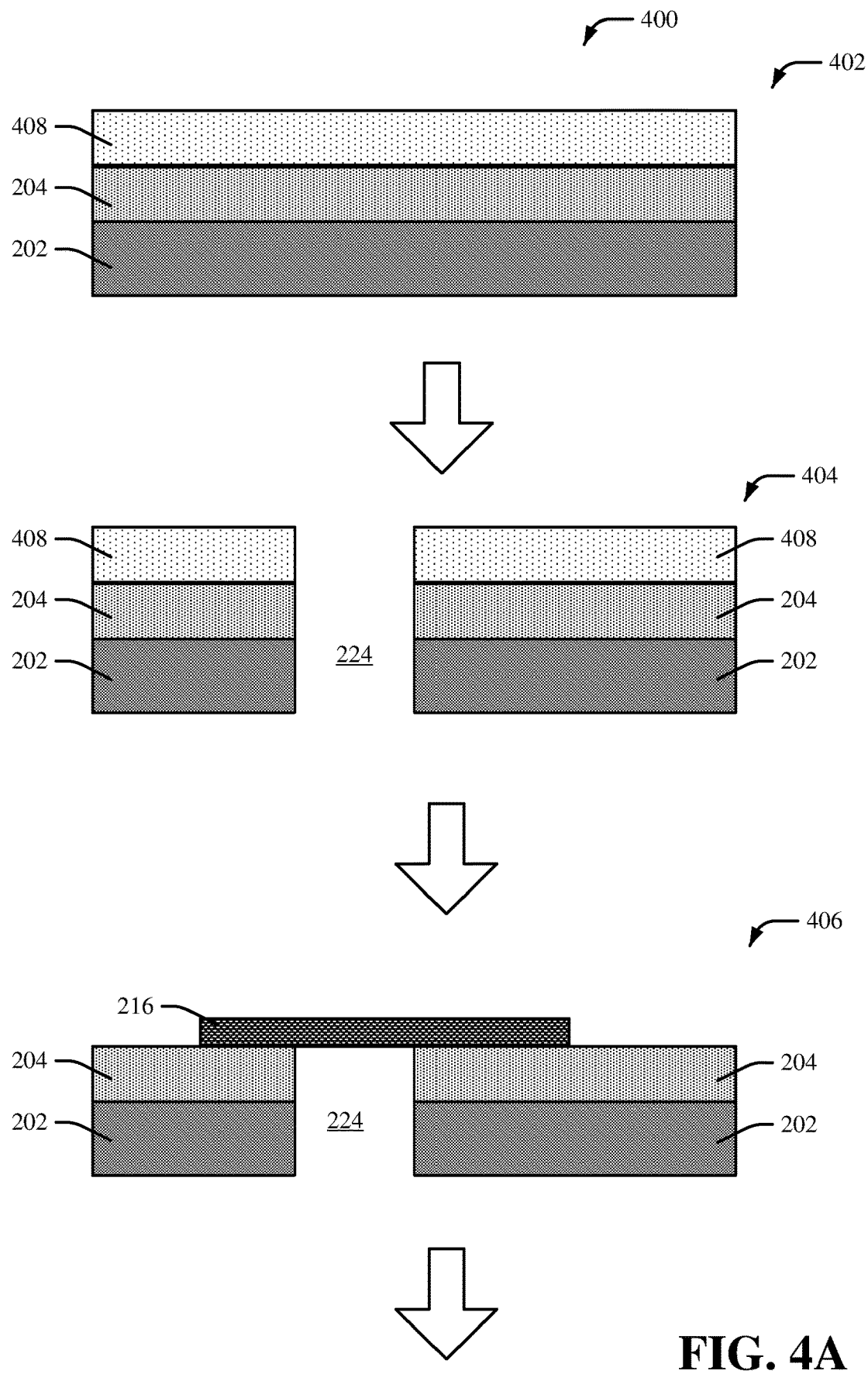
FIG. 4A illustrates an example, non-limiting process associated with fabricating a sandwich-parallel micro-battery in accordance with one or more embodiments described herein.
Figure 4B:
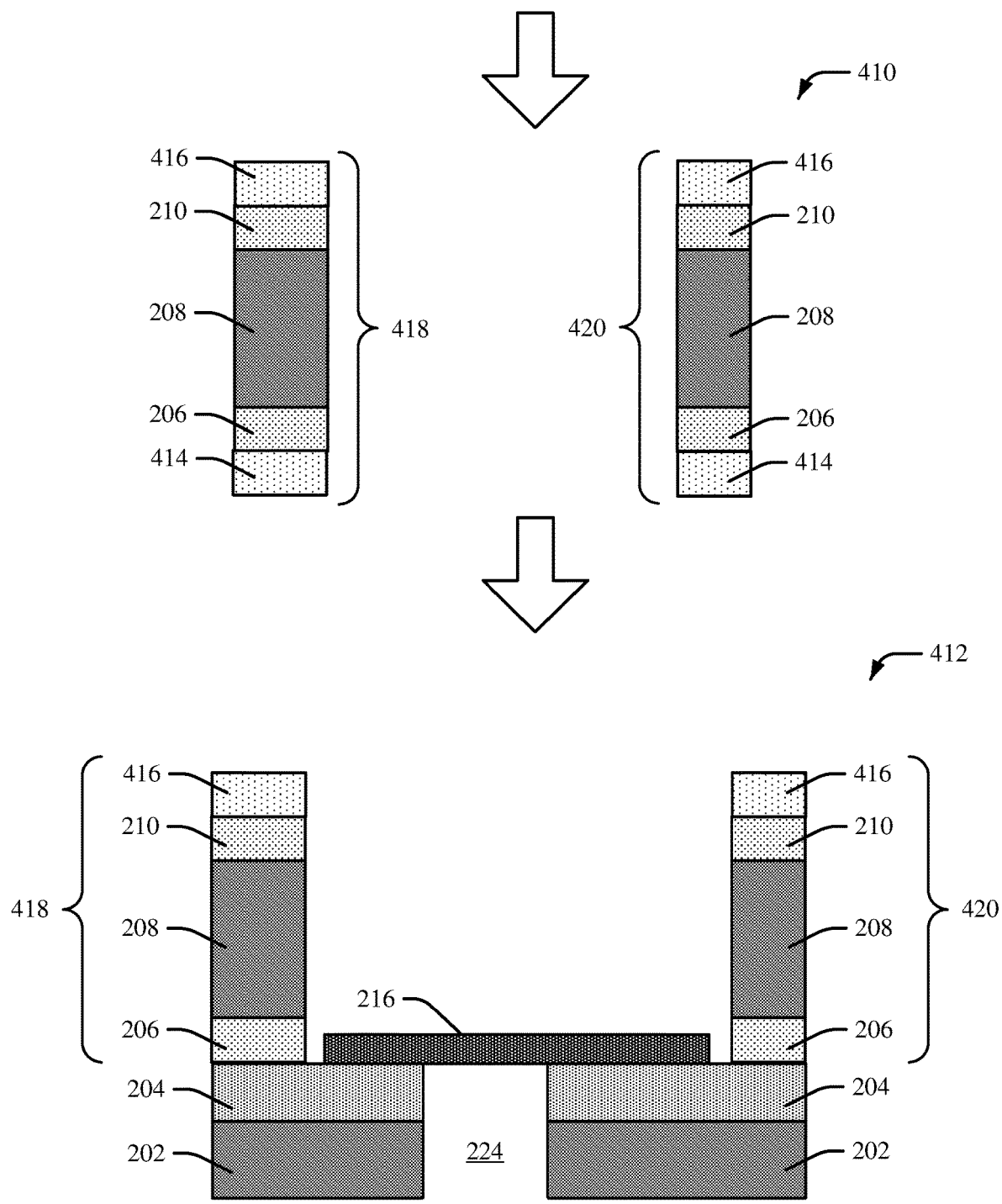
FIG. 4B further illustrates the example, non-limiting process associated with fabricating a sandwich-parallel micro-battery in accordance with one or more embodiments described herein.
Figure 4C:
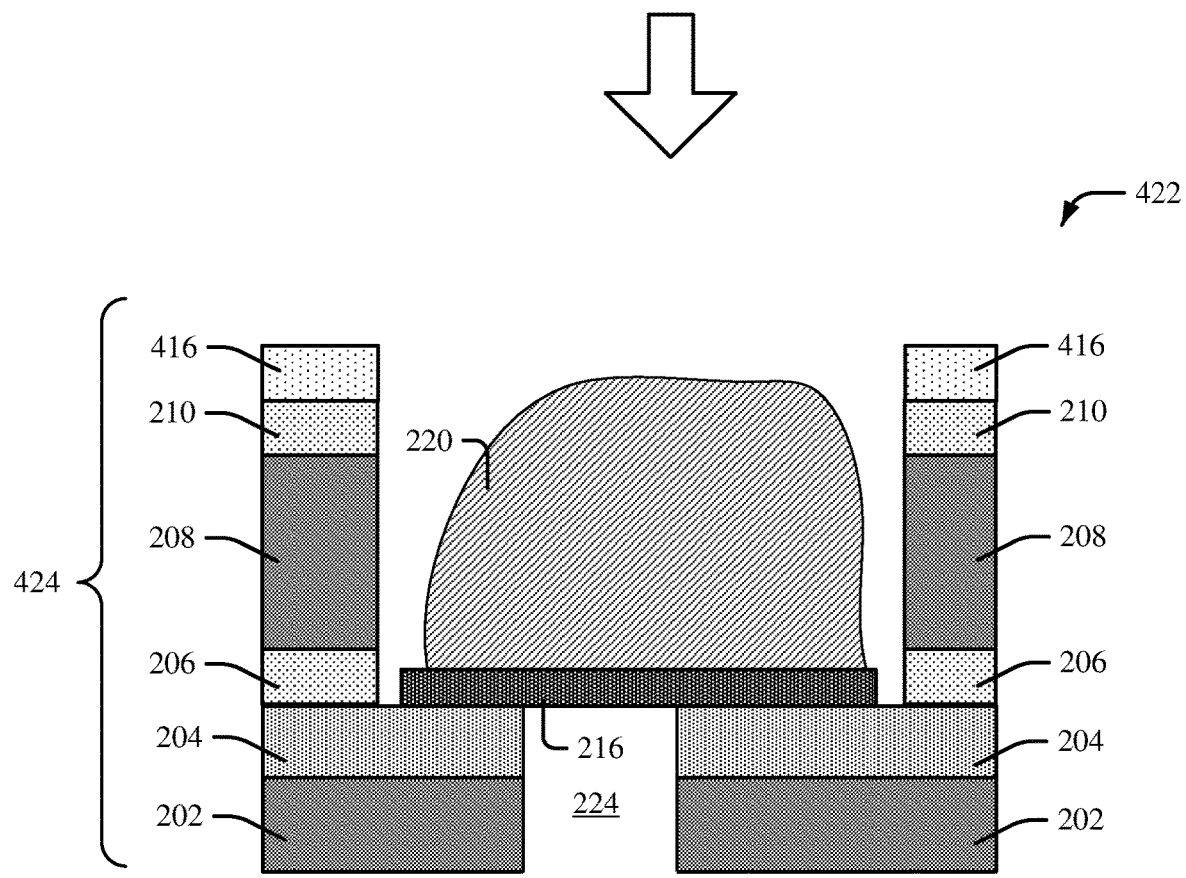
FIG. 4C further illustrates the example, non-limiting process associated with fabricating a sandwich-parallel micro-battery in accordance with one or more embodiments described herein.

FIG. 4A, FIG. 4B and FIG. 4C pictorially depict an example process 400 for fabricating at least a portion of a micro-battery in accordance with one or more embodiments described herein. Repetitive description of like elements employed in other embodiments described herein is omitted for sake of brevity.

With reference to FIG. 4A, presented is a device structure step 402, a device structure step 404 and a device structure step 406. The device structure step 402 can include the substrate 202, the curable adhesive layer 204 and/or a cover sheet layer 408. The curable adhesive layer 204 can be deposited onto the substrate 202. Furthermore, the cover sheet layer 408 can be formed on the curable adhesive layer 204. The cover sheet layer 408 can be, for example, a non-adhesive layer. For example, the cover sheet layer 408 can include polyethylene. The substrate 202 can be, for example, an ultraviolet transparent flexible substrate. The curable adhesive layer 204 can be, for example, an ultraviolet curable adhesive. In certain embodiments, the substrate 202 can be deposited onto a polyester layer such as, for example, a polyethylene naphthalate layer or a polyethylene terephthalate layer. In a non-limiting example, a thickness of the curable adhesive layer 204 can be between 1 μm and 10 μm. In another non-limiting example, a thickness of the cover sheet layer 408 can be between 10 μm and 50 μm. The device structure step 404 can include the substrate 202, the curable adhesive layer 204 and/or the cover sheet layer 408. The opening 224 can be formed in the substrate 202, the curable adhesive layer 204 and/or the cover sheet layer 408. For example, the substrate 202, the curable adhesive layer 204 and/or the cover sheet layer 408 can be mechanically drilled to form the opening 224. In another example, the substrate 202, the curable adhesive layer 204 and/or the cover sheet layer 408 can be laser drilled to form the opening 224. The device structure step 406 can include the substrate 202, the curable adhesive layer 204 and/or the conductive layer 216. The cover sheet layer 408 can be removed from the curable adhesive layer 204. The conductive layer 216 can be deposited, for example, on the curable adhesive layer 204. Furthermore, the conductive layer 216 can be deposited over the opening 224. In an example, the conductive layer 216 can be a titanium foil layer. In a non-limiting example, a thickness of the conductive layer 216 can be between 1 μm and 10 μm. In an aspect, the conductive layer 216 can be a cathode current collector.

With reference to FIG. 4B, presented is a device structure step 410 and a device structure step 412. The device structure step 410 can be performed following the device structure step 406 shown in FIG. 4A. The device structure step 410 can include the adhesive layer 206, the core layer 208, the adhesive layer 210, a cover sheet layer 414 and/or a cover sheet layer 416. In an embodiment, the adhesive layer 206, the core layer 208, the adhesive layer 210, the cover sheet layer 414 and/or the cover sheet layer 416 can be laser cut to form a first device structure 418 and a second device structure 420. The first device structure 418 can include the adhesive layer 206, the core layer 208, the adhesive layer 210, the cover sheet layer 414 and/or the cover sheet layer 416. Furthermore, the second device structure 420 can include the adhesive layer 206, the core layer 208, the adhesive layer 210, the cover sheet layer 414 and/or the cover sheet layer 416. The core layer 208 can be deposited onto the adhesive layer 206. Furthermore, the adhesive layer 210 can be deposited on to the core layer 208. The adhesive layer 206 can also be attached to the cover sheet layer 414. The cover sheet layer 414 can be, for example, a non-adhesive layer. For example, the cover sheet layer 414 can include polyethylene. Additionally, the adhesive layer 210 can also be attached to the cover sheet layer 416. The cover sheet layer 416 can be, for example, a non-adhesive layer. For example, the cover sheet layer 416 can include polyethylene. In certain embodiments, the adhesive layer 206 and/or the adhesive layer 210 can be a curable adhesive layer such as, for example, an ultraviolet curable adhesive layer. The device structure step 412 can include the substrate 202, the curable adhesive layer 204, the conductive layer 216, the adhesive layer 206, the core layer 208, the adhesive layer 210 and/or the cover sheet layer 416. For instance, the cover sheet layer 414 can be removed from the first device structure 418 and the second device structure 420. Furthermore, the first device structure 418 and the second device structure 420 without the cover sheet layer 414 can be attached to the curable adhesive layer 204. For example, the adhesive layer 206 of the first device structure 418 and the second device structure 420 can be attached to the curable adhesive layer 204.

With reference to FIG. 4C, presented is a device structure step 422. The device structure step 422 can be performed following the device structure step 412 shown in FIG. 4B. The device structure step 422 can include the substrate 202, the curable adhesive layer 204, the conductive layer 216, the adhesive layer 206, the core layer 208, the adhesive layer 210, the cover sheet layer 416 and/or the paste material 220. The paste material 220 can be dispensed onto the conductive layer 216. The paste material 220 can be, for example, a cathode material. In one example, the paste material 220 can be a manganese dioxide paste. In another example, the paste material 220 can be a carbon paste. In yet another example, the paste material 220 can be a zinc chloride paste. In an embodiment, the device structure step 422 can form a device structure 424. The device structure 424 can form a portion of a micro-battery such as a portion of the micro-battery 102, the micro-battery 104, the device 200, the micro-battery 302 and/or the micro-battery 304.

Figure 5A:
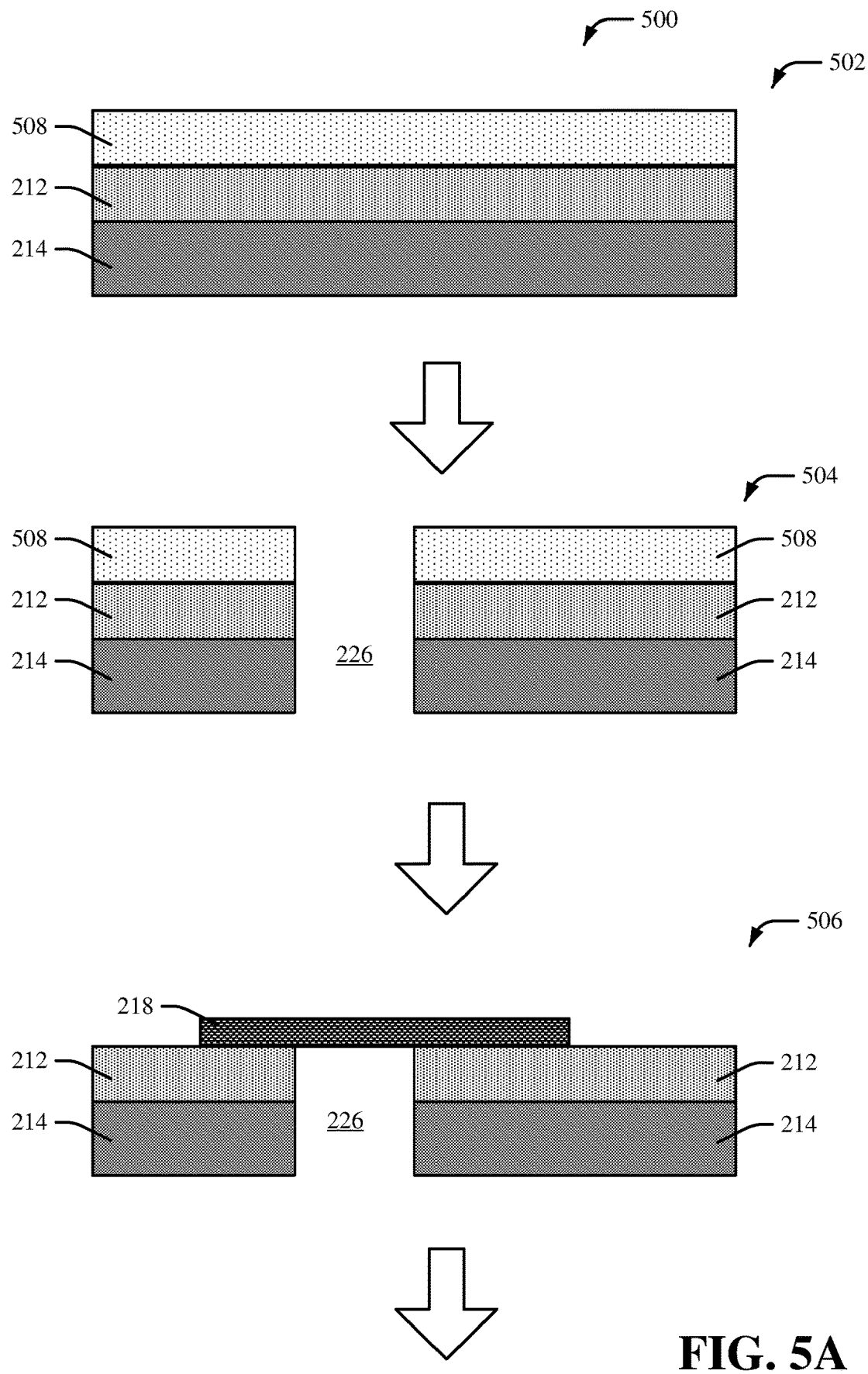
FIG. 5A illustrates an example, non-limiting process associated with fabricating a sandwich-parallel micro-battery in accordance with one or more embodiments described herein.
Figure 5B:
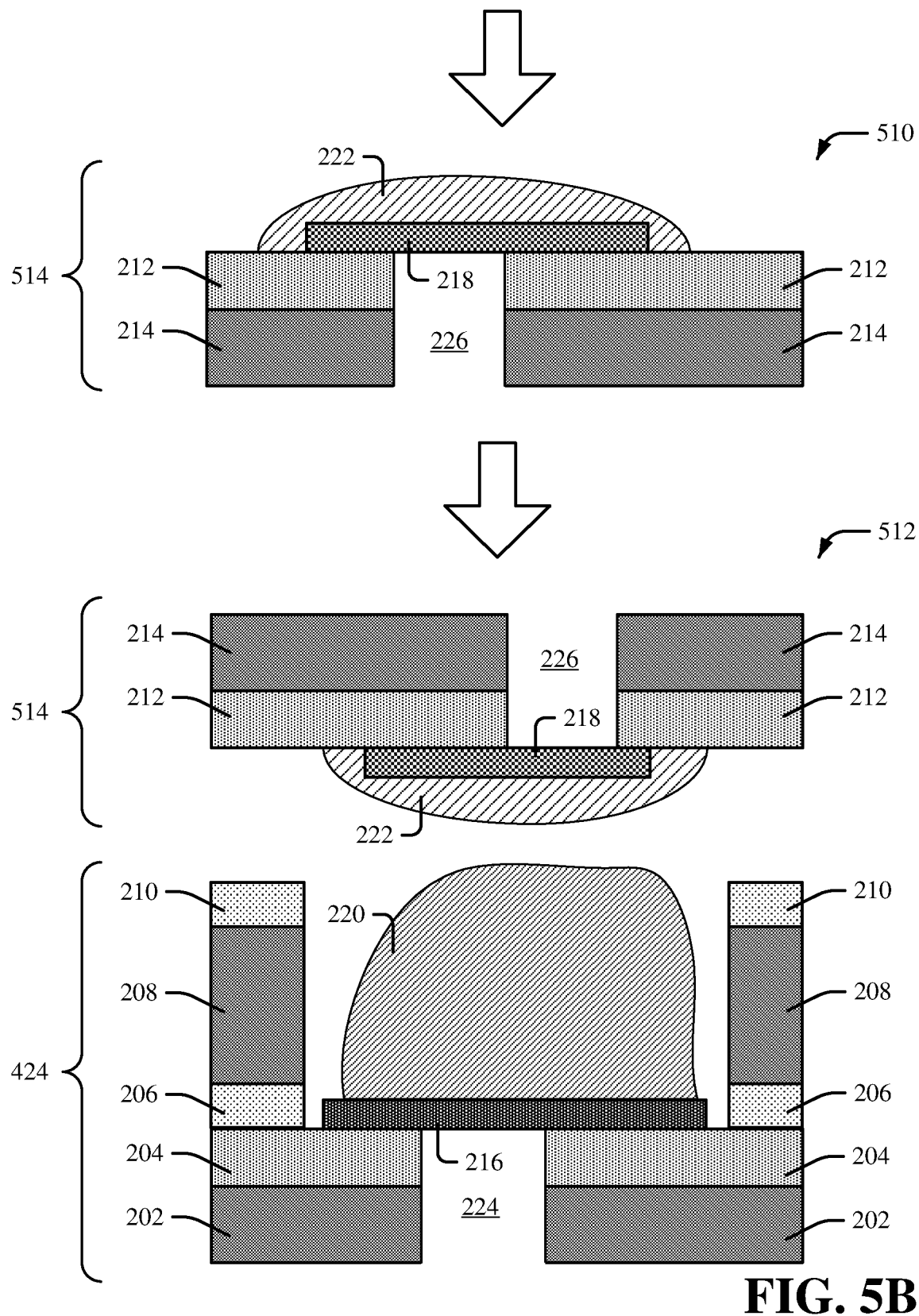
FIG. 5B further illustrates the example, non-limiting process associated with fabricating a sandwich-parallel micro-battery in accordance with one or more embodiments described herein.

FIG. 5A and FIG. 5B pictorially depict an example process 500 for fabricating at least a portion of a micro-battery in accordance with one or more embodiments described herein. Repetitive description of like elements employed in other embodiments described herein is omitted for sake of brevity.

With reference to FIG. 5A, presented is a device structure step 502, a device structure step 504 and a device structure step 506. The device structure step 502 can include the substrate 214, the curable adhesive layer 212 and/or a cover sheet layer 508. The curable adhesive layer 212 can be deposited onto the substrate 214. Furthermore, the cover sheet layer 508 can be formed on the curable adhesive layer 212. The cover sheet layer 508 can be, for example, a non-adhesive layer. For example, the cover sheet layer 508 can include polyethylene. The substrate 214 can be, for example, an ultraviolet transparent flexible substrate. The curable adhesive layer 212 can be, for example, an ultraviolet curable adhesive. In certain embodiments, the substrate 214 can be deposited onto a polyester layer such as, for example, a polyethylene naphthalate layer or a polyethylene terephthalate layer. In a non-limiting example, a thickness of the curable adhesive layer 212 can be between 1 μm and 10 μm. In another non-limiting example, a thickness of the cover sheet layer 508 can be between 10 μm and 50 μm. The device structure step 504 can include the substrate 214, the curable adhesive layer 212 and/or the cover sheet layer 508. The opening 226 can be formed in the substrate 214, the curable adhesive layer 212 and/or the cover sheet layer 508. For example, the substrate 214, the curable adhesive layer 212 and/or the cover sheet layer 508 can be mechanically drilled to form the opening 226. In another example, the substrate 214, the curable adhesive layer 212 and/or the cover sheet layer 508 can be laser drilled to form the opening 226. The device structure step 506 can include the substrate 214, the curable adhesive layer 212 and/or the conductive layer 218. The cover sheet layer 508 can be removed from the curable adhesive layer 212. The conductive layer 218 can be deposited, for example, on the curable adhesive layer 212. Furthermore, the conductive layer 218 can be deposited over the opening 226. In an example, the conductive layer 218 can be a zinc foil layer. In a non-limiting example, a thickness of the conductive layer 218 can be between 1 μm and 10 μm. In an aspect, the conductive layer 218 can be an anode material.

With reference to FIG. 5B, presented is a device structure step 510 and a device structure step 512. The device structure step 510 can be performed following the device structure step 406 shown in FIG. 5A. The device structure step 510 can include the substrate 214, the curable adhesive layer 212, the conductive layer 218 and/or the hydrogel material 222. The hydrogel material 222 can be dispensed onto the conductive layer 218. Furthermore, the hydrogel material 222 can be dispensed on a portion of the curable adhesive layer 212. The hydrogel material 222 can be a liquid and/or a gel that comprises one or more polymeric materials. For example, the hydrogel material 222 can be water-soluble polymer (e.g., a cellulose ether) such as a water-soluble methylcellulose polymer, a water-soluble hydroxypropyl methylcellulose polymer, or another type of water-soluble polymer. In another example, the hydrogel material 222 can be a photo-initiated and/or an ultraviolet light-initiated gel such as Polyethylene (glycol) Diacrylate. In yet another example, the hydrogel material 222 can be a zinc chloride hydrogel. In an embodiment, the device structure step 510 can form a device structure 514. The device structure 514 can form a portion of a micro-battery such as a portion of the micro-battery 102, the micro-battery 104, the device 200, the micro-battery 302 and/or the micro-battery 304. The device structure step 510 can include the device structure 514 that includes the substrate 214, the curable adhesive layer 212, the conductive layer 218 and/or the hydrogel material 222. The device structure step 510 can also include the device structure 424 that includes the substrate 202, the curable adhesive layer 204, the conductive layer 216, the adhesive layer 206, the core layer 208, the adhesive layer 210 and/or the paste material 220. In an aspect, the device structure step 510 can include the device structure 424 without the cover sheet layer 416. For instance, the cover sheet layer 416 can be removed from the device structure 424. In an embodiment, the device structure 514 can be attached to the device structure 424. For instance, the device structure 514 can be attached to the device structure 424 to form a micro-battery such as the device 200. In an aspect, the cover sheet layer 416 can be removed from the device structure 514. Furthermore, the curable adhesive layer 212 of the device structure 514 can be deposited onto the adhesive layer 210 of the device structure 424. In an embodiment, side bonding, ultraviolet curing, and/or a compression process can be performed to facilitate attaching the curable adhesive layer 212 of the device structure 514 to the adhesive layer 210 of the device structure 424. In certain embodiments, the curable adhesive layer 212 of the device structure 514 can be bonded to the adhesive layer 210 of the device structure 424 at a particular temperature (e.g., between 80° C. and 120° C.). For example, in certain embodiments, the curable adhesive layer 212 of the device structure 514 and/or the curable adhesive layer 212 of the device structure 514 can be a thermal cure adhesive.

Figure 6:
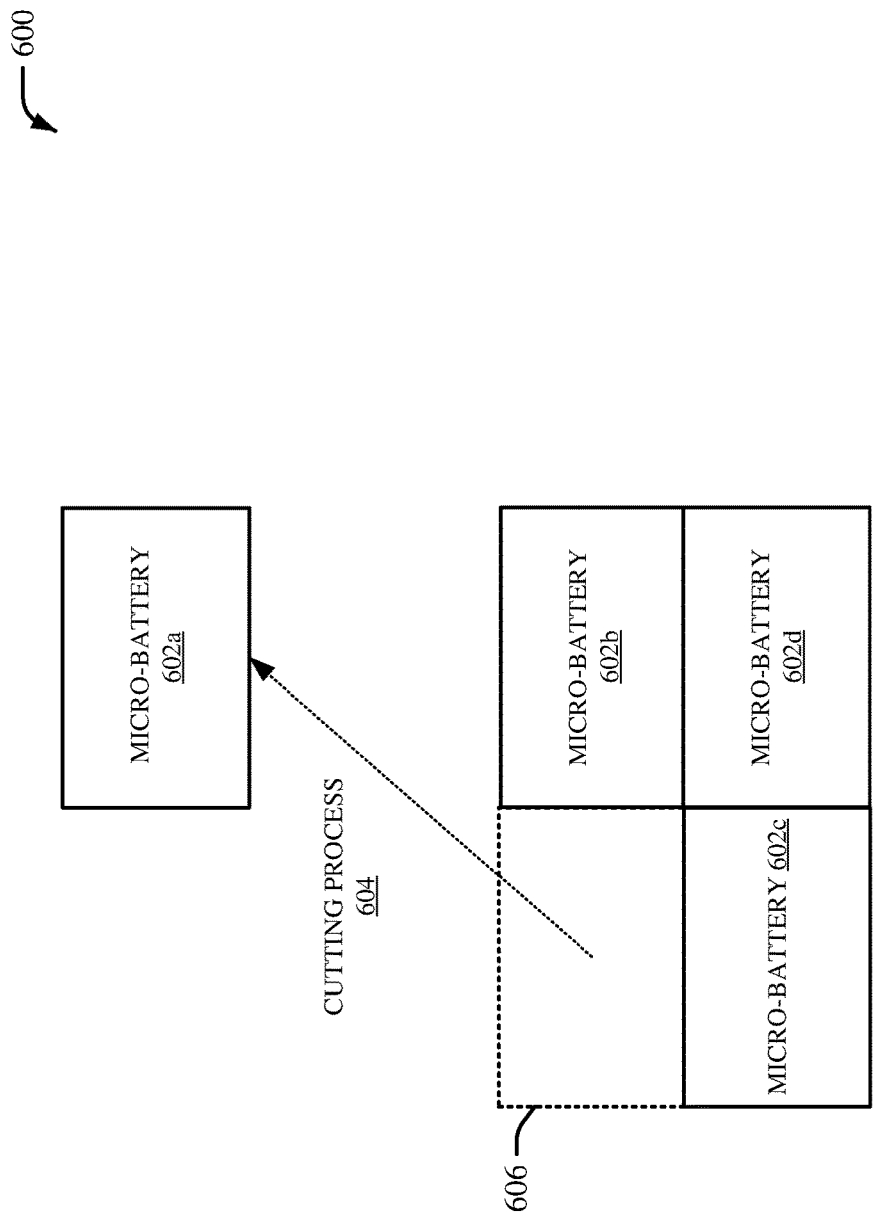
FIG. 6 illustrates an example, non-limiting system associated with a cutting process in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 can include a set of micro-batteries 602a-d. The set of micro-batteries 602a-d can be attached together via a panel process. In an embodiment, a cutting process 604 can be performed to remove a micro-battery 602a-d (e.g., micro-battery 602a) from the set of micro-batteries 602a-d. For instance, a portion 606 of a panel can be cut through via the cutting process 604 to facilitate removal of a micro-battery 602a-d (e.g., micro-battery 602a) from the set of micro-batteries 602a-d. In one example, the cutting process 604 can be a mechanical cut. In another example, the cutting process 604 can be a laser cut.

Figure 7:
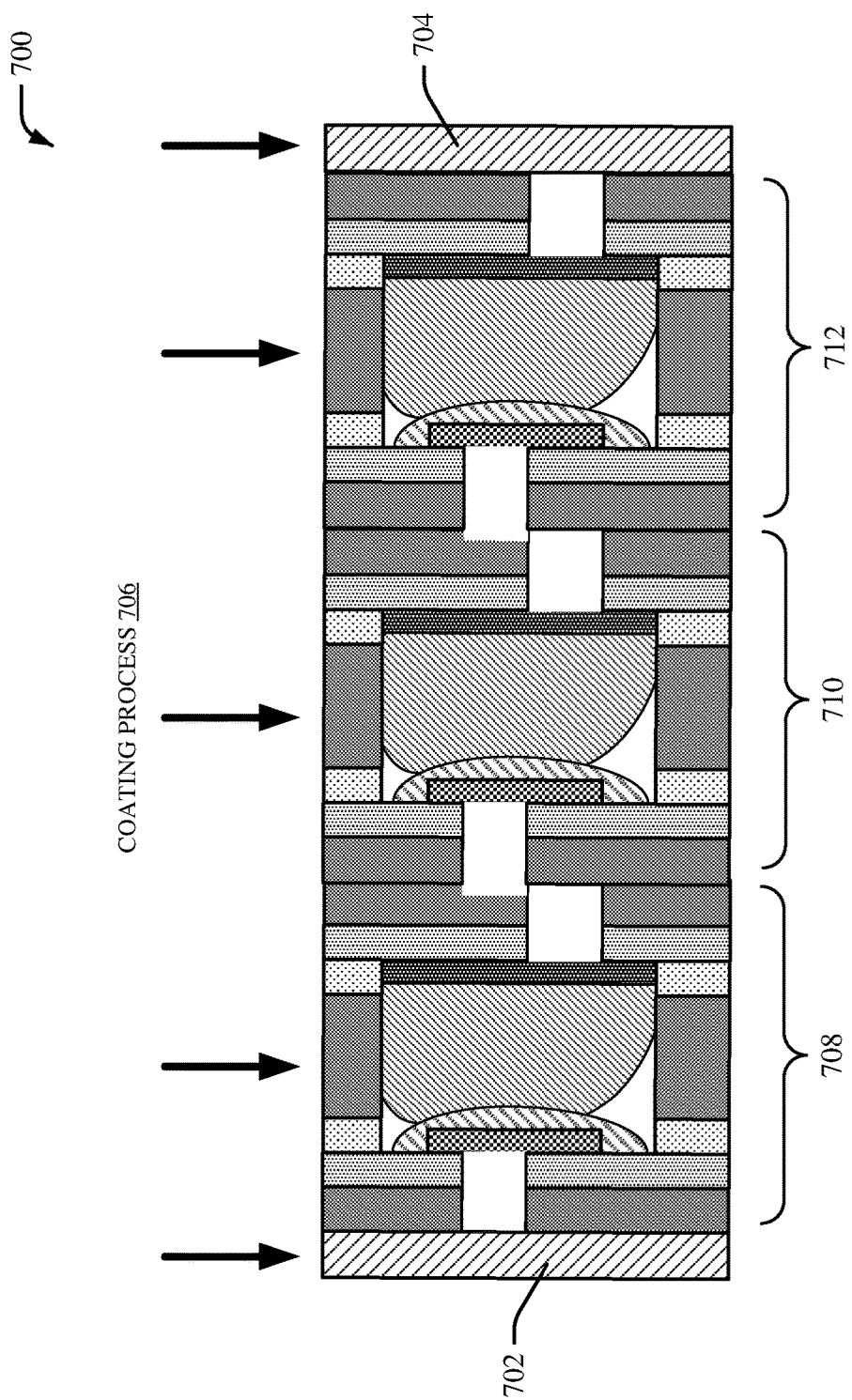
FIG. 7 illustrates an example, non-limiting system associated with a coating process in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 includes a fixture 702 and a fixture 704. The fixture 702 and the fixture 704 can be employed to hold one or more devices (e.g., one or more micro-batteries) during a coating process 706. For example, the fixture 702 and the fixture 704 can be employed to hold a device 708, a device 710 and a device 712 during the coating process 706. The device 708 can be a first micro-battery, the device 710 can be a second micro-battery, and the device 712 can be a third micro-battery. In an embodiment, the device 708, the device 710 and/or the device 712 can correspond to the micro-battery 102, the micro-battery 104, the device 200, the micro-battery 302, and/or the micro-battery 304. In an aspect, the coating process 706 can deposit a coating (e.g., the coating 106, the coating 108, the coating 110, etc.) on a surface of the device 708, the device 710 and/or the device 712. For example, the coating process 706 can deposit a metal coating on a surface of the device 708, the device 710 and/or the device 712. In another example, the coating process 706 can deposit a polymer coating on a surface of the device 708, the device 710 and/or the device 712. In certain embodiments, the coating process 706 can employ rotation to deposit a coating (e.g., the coating 106, the coating 108, the coating 110, etc.) on a surface of the device 708, the device 710 and/or the device 712. For example, the fixture 702, the fixture 704, the device 708, the device 710 and/or the device 712 can be rotated during depositing of a coating (e.g., the coating 106, the coating 108, the coating 110, etc.) on a surface of the device 708, the device 710 and/or the device 712. In certain embodiments, the coating process 706 can employ a sputtering process to deposit a coating (e.g., the coating 106, the coating 108, the coating 110, etc.) on a surface of the device 708, the device 710 and/or the device 712. In certain embodiments, the coating process 706 can employ an evaporation process to deposit a coating (e.g., the coating 106, the coating 108, the coating 110, etc.) on a surface of the device 708, the device 710 and/or the device 712. In certain embodiments, the coating process 706 can employ an atomic layer deposition process to deposit a coating (e.g., the coating 106, the coating 108, the coating 110, etc.) on a surface of the device 708, the device 710 and/or the device 712. In certain embodiments, the coating process 706 can employ a spray coating process to deposit a coating (e.g., the coating 106, the coating 108, the coating 110, etc.) on a surface of the device 708, the device 710 and/or the device 712.

FIG. 8A, FIG. 8B, FIG. 8C and FIG. 8D pictorially depict an example process 800 for fabricating at least a portion of a micro-battery in accordance with one or more embodiments described herein. Repetitive description of like elements employed in other embodiments described herein is omitted for sake of brevity.

Figure 8A:
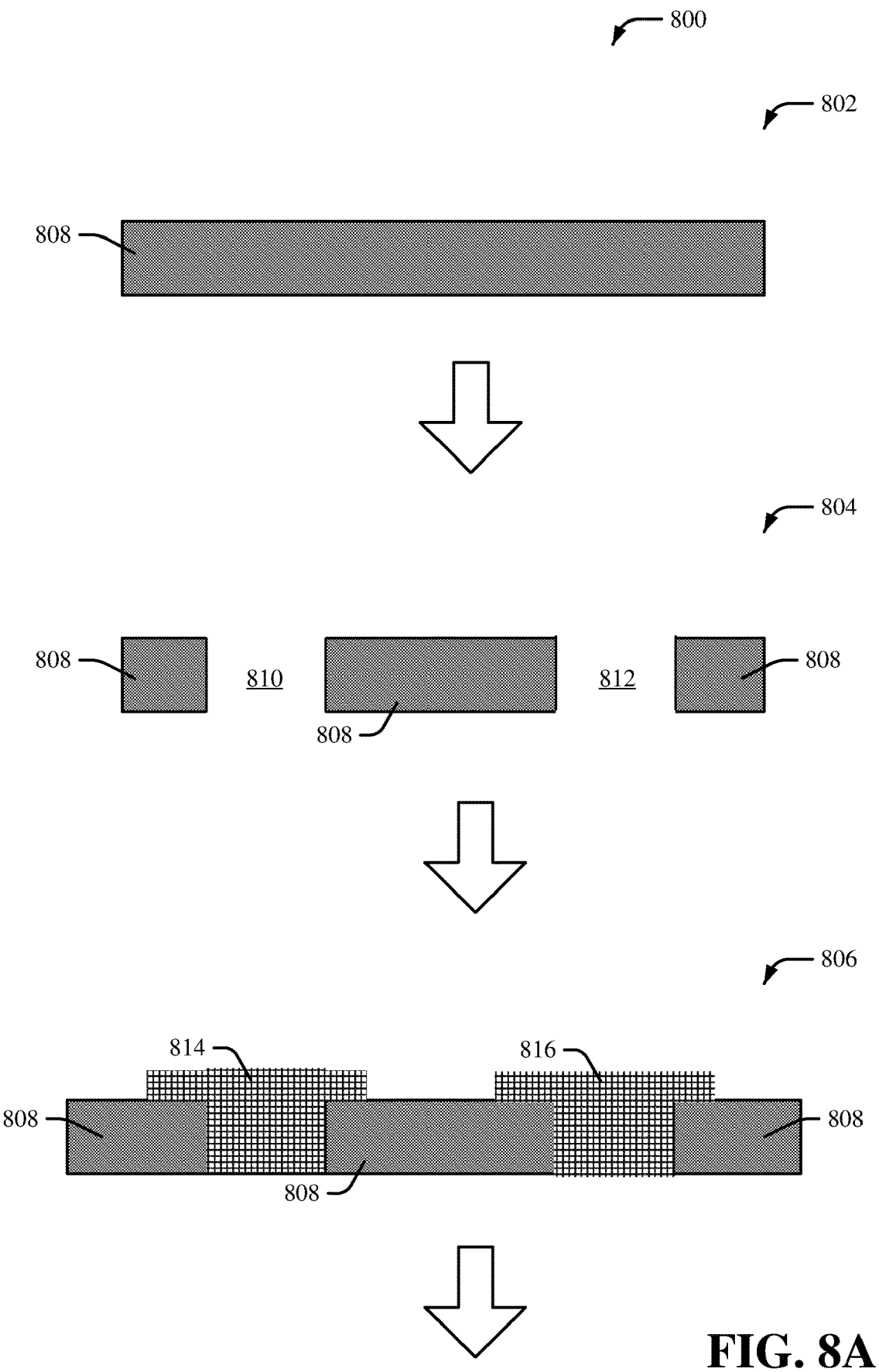
FIG. 8A illustrates an example, non-limiting process associated with fabricating a sandwich-parallel micro-battery in accordance with one or more embodiments described herein.

With reference to FIG. 8A, presented is a device structure step 802, a device structure step 804 and a device structure step 806. The device structure step 802 can include a substrate 808. The substrate 808 can be, for example, a flexible substrate. For example, the substrate 808 can be a flexible plastic substrate, a flexible glass substrate, or a flexible silicon substrate. In one example, the substrate 808 can be an ultraviolet transparent flexible substrate. In another example, the substrate 808 can be a polyethylene naphthalate substrate. In yet another example, the substrate 808 can be a polyethylene terephthalate substrate. In a non-limiting example, a thickness of the substrate 808 can be between 10 μm and 50 μm. The device structure step 804 can include the substrate 808. In an aspect, an opening 810 and/or an opening 812 can be formed in the substrate 808. For example, the substrate 808 can be mechanically drilled to form the opening 810 and/or the opening 812. In another example, the substrate 808 can be laser drilled to form the opening 810 and/or the opening 812. The device structure step 804 can include the substrate 808, ink material 814 and/or ink material 816. The ink material 814 can be, for example, a carbon ink material. Furthermore, the ink material 814 can be a carbon collector. The ink material 816 can also be, for example, a carbon ink material. Furthermore, the ink material 816 can be a carbon collector. In an aspect, the ink material 814 can be formed in the opening 810 and/or the ink material 816 can be formed in the opening 812. In an embodiment, the ink material 814 can be formed in the opening 810 and/or the ink material 816 can be formed in the opening 812 via stencil printing. In another embodiment, the ink material 814 can be formed in the opening 810 and/or the ink material 816 can be formed in the opening 812 via dispensing of carbon ink.

Figure 8B:
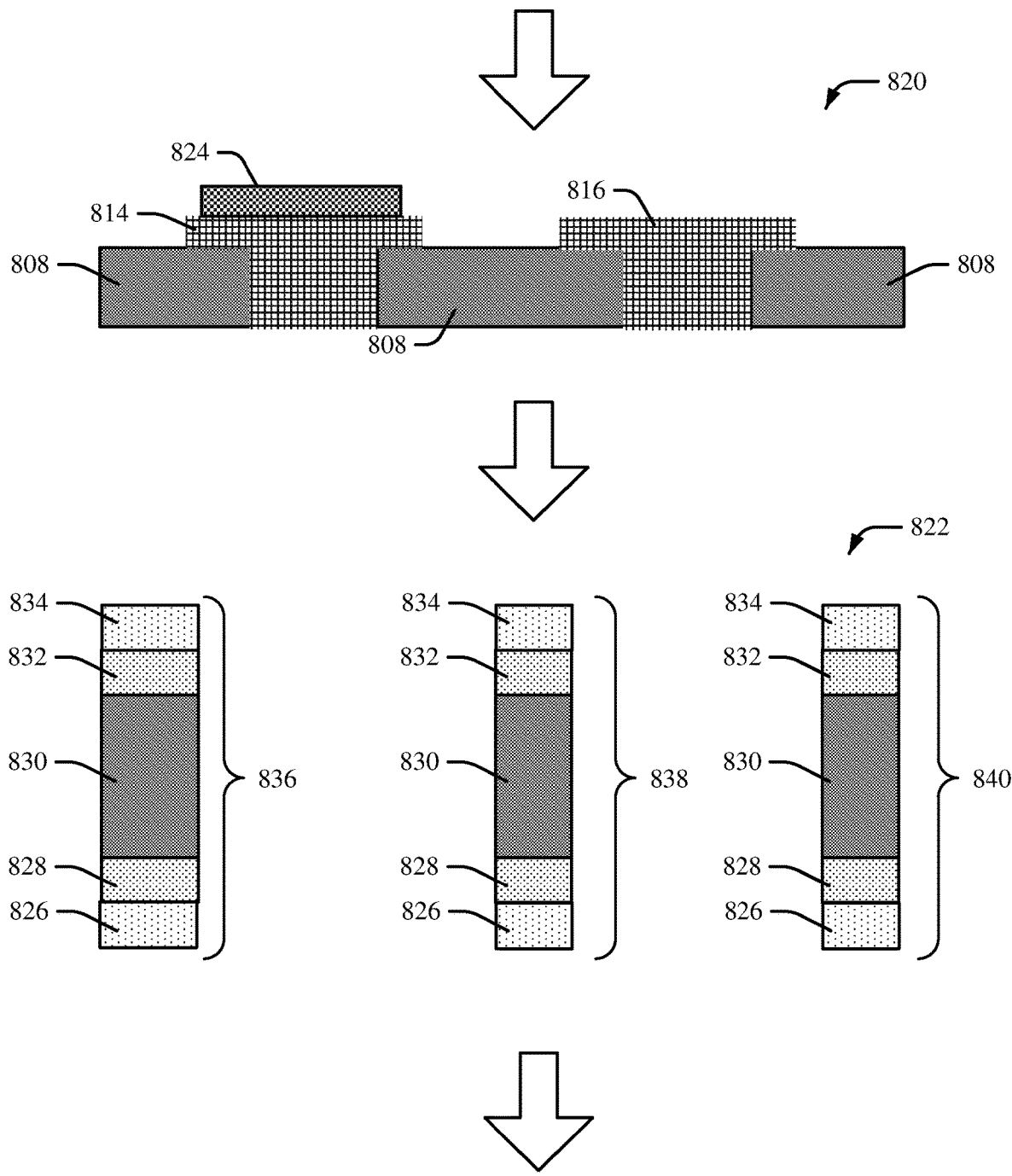
FIG. 8B further illustrates the example, non-limiting process associated with fabricating a sandwich-parallel micro-battery in accordance with one or more embodiments described herein.

With reference to FIG. 8B, presented is a device structure step 820 and a device structure step 822. The device structure step 820 can be performed following the device structure step 806 shown in FIG. 8A. The device structure step 820 can include the substrate 808, the ink material 814, the ink material 816 and/or a conductive layer 824. The conductive layer 824 can be deposited, for example, on the ink material 814. In an example, the conductive layer 824 can be a zinc foil layer. In a non-limiting example, a thickness of the conductive layer 824 can be between 1 μm and 10 μm. In an aspect, the conductive layer 824 can be an anode material. The device structure step 822 can include a cover sheet layer 826, an adhesive layer 828, a core layer 830, an adhesive layer 832 and/or a cover sheet layer 834. In an embodiment, the cover sheet layer 826, the adhesive layer 828, the core layer 830, the adhesive layer 832 and/or the cover sheet layer 834 can be laser cut to form a first device structure 836, a second device structure 838 and/or a third device structure 840. The first device structure 836 can include the cover sheet layer 826, the adhesive layer 828, the core layer 830, the adhesive layer 832 and/or the cover sheet layer 834. Furthermore, the second device structure 838 can include the cover sheet layer 826, the adhesive layer 828, the core layer 830, the adhesive layer 832 and/or the cover sheet layer 834. The third device structure 840 can also include the cover sheet layer 826, the adhesive layer 828, the core layer 830, the adhesive layer 832 and/or the cover sheet layer 834. The core layer 830 can be deposited onto the adhesive layer 828. Furthermore, the adhesive layer 832 can be deposited on to the core layer 830. The adhesive layer 828 can also be attached to the cover sheet layer 826. The cover sheet layer 826 can be, for example, a non-adhesive layer. For example, the cover sheet layer 826 can include polyethylene. Additionally, the adhesive layer 832 can also be attached to the cover sheet layer 834. The cover sheet layer 834 can be, for example, a non-adhesive layer. For example, the cover sheet layer 834 can include polyethylene. In certain embodiments, the adhesive layer 828 and/or the adhesive layer 832 can be a curable adhesive layer such as, for example, an ultraviolet curable adhesive layer.

Figure 8C:
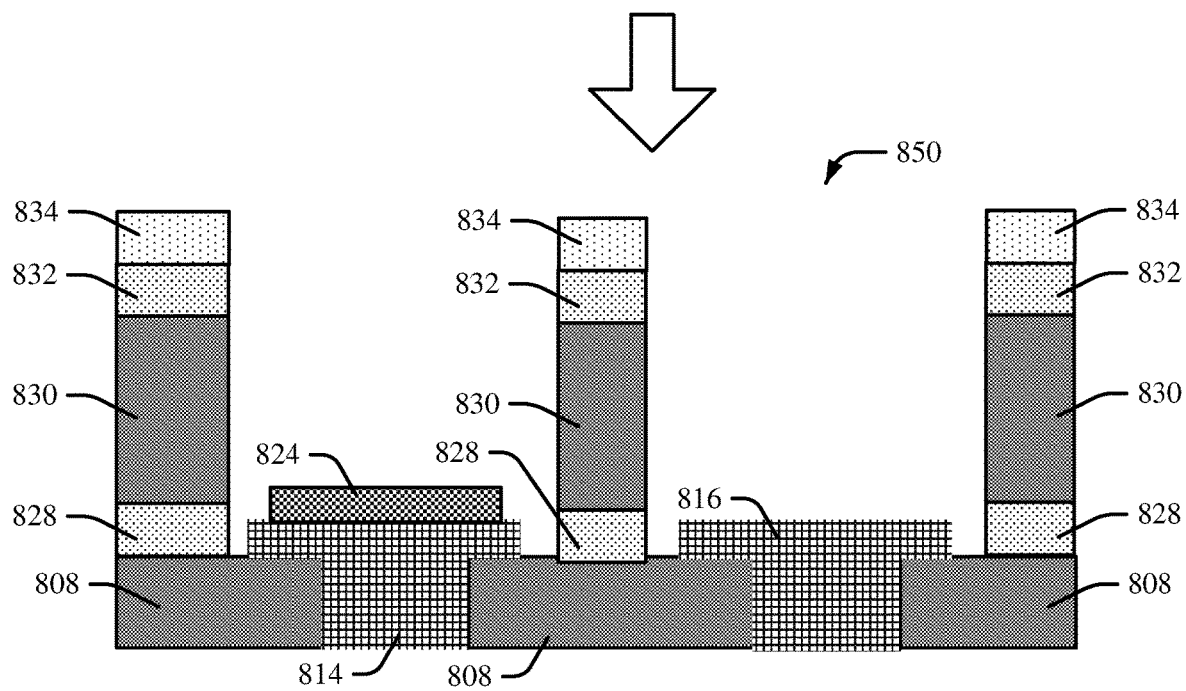
FIG. 8C further illustrates the example, non-limiting process associated with fabricating a sandwich-parallel micro-battery in accordance with one or more embodiments described herein.
Figure 8C:
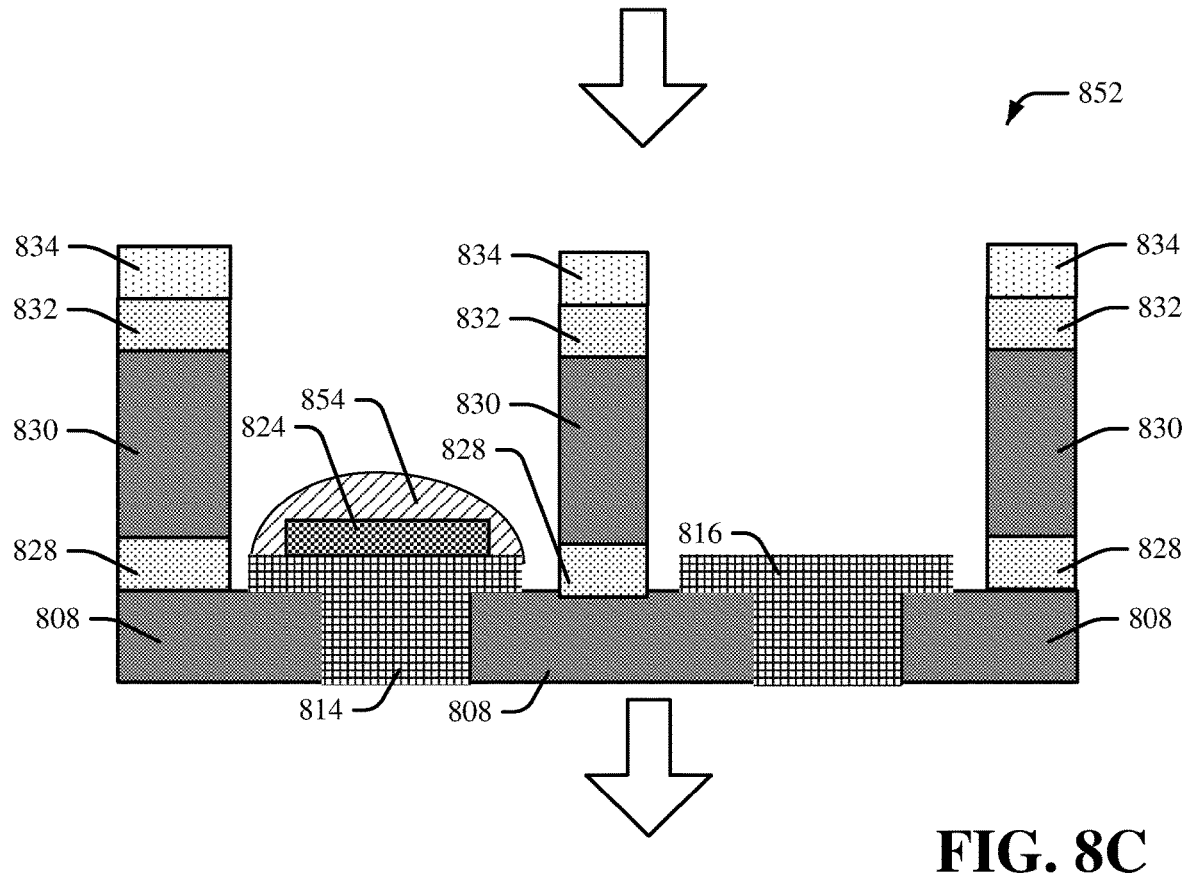

With reference to FIG. 8C, presented is a device structure step 850 and a device structure step 852. The device structure step 850 can be performed following the device structure step 822 shown in FIG. 8B. The device structure step 850 can include the substrate 808, the ink material 814, the ink material 816, the conductive layer 824, the adhesive layer 828, the core layer 830, the adhesive layer 832, and/or the cover sheet layer 834. For instance, the cover sheet layer 826 can be removed from the first device structure 836, the second device structure 838 and the third device structure 840. Furthermore, the first device structure 836, the second device structure 838 and the third device structure 840 without the cover sheet layer 826 can be attached to the substrate 808. For example, the adhesive layer 828 of the first device structure 836, the second device structure 838 and the third device structure 840 can be attached to the substrate 808. The device structure step 852 can include the substrate 808, the ink material 814, the ink material 816, the conductive layer 824, the adhesive layer 828, the core layer 830, the adhesive layer 832, the cover sheet layer 834 and/or hydrogel material 854. The hydrogel material 854 can be dispensed onto the conductive layer 824. Furthermore, the hydrogel material 854 can be dispensed on a portion of the ink material 814. The hydrogel material 854 can be a liquid and/or a gel that comprises one or more polymeric materials. For example, the hydrogel material 854 can be water-soluble polymer (e.g., a cellulose ether) such as a water-soluble methylcellulose polymer, a water-soluble hydroxypropyl methylcellulose polymer, or another type of water-soluble polymer. In another example, the hydrogel material 854 can be a photo-initiated and/or an ultraviolet light-initiated gel such as Polyethylene (glycol) Diacrylate. In yet another example, the hydrogel material 854 can be a zinc chloride hydrogel.

Figure 8D:
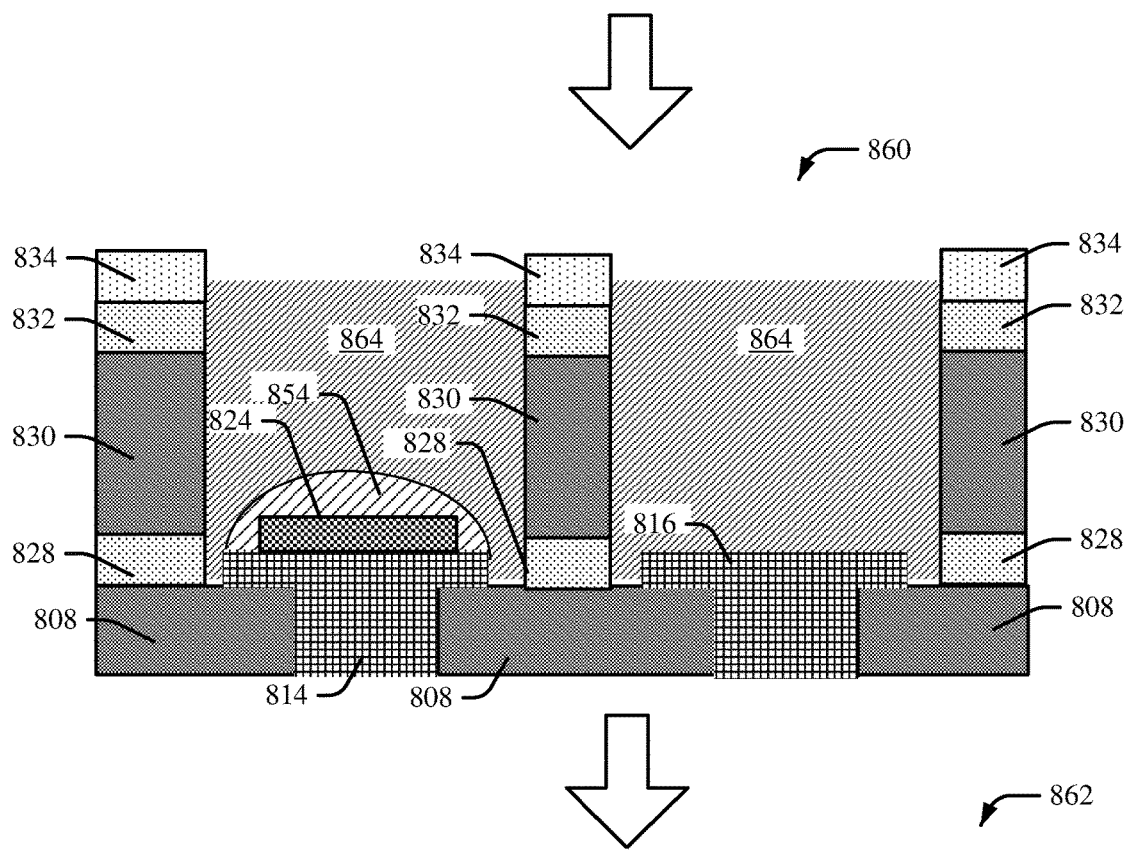
FIG. 8D further illustrates the example, non-limiting process associated with fabricating a sandwich-parallel micro-battery in accordance with one or more embodiments described herein.
Figure 8D:
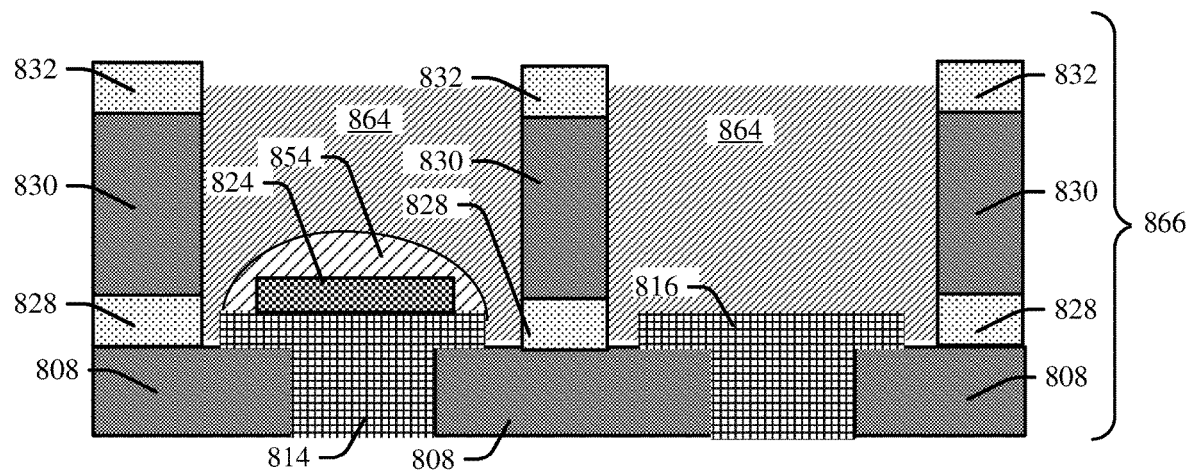

With reference to FIG. 8D, presented is a device structure step 860 and a device structure step 862. The device structure step 860 can be performed following the device structure step 862 shown in FIG. 8D. The device structure step 860 can include the substrate 808, the ink material 814, the ink material 816, the conductive layer 824, the adhesive layer 828, the core layer 830, the adhesive layer 832, the cover sheet layer 834, the hydrogel material 854 and/or paste material 856. The paste material 856 can be deposited onto the ink material 814, the ink material 816 and/or the hydrogel material 854. Additionally, the paste material 856 can be deposited on a portion of the substrate 808. The paste material 856 can be a curing paste. Furthermore, the paste material 856 can serve as a cathode. For instance, the paste material 856 can be a cathode material. In one example, the paste material 856 can be a manganese dioxide paste. In another example, the paste material 856 can be a carbon paste. In yet another example, the paste material 856 can be a zinc chloride paste. The device structure step 862 can include the substrate 808, the ink material 814, the ink material 816, the conductive layer 824, the adhesive layer 828, the core layer 830, the adhesive layer 832, the hydrogel material 854 and/or paste material 856. In an aspect, the cover sheet layer 834 can be removed from the adhesive layer 832. In an embodiment, the device structure step 862 can form a device structure 866. The device structure 866 can form a portion of a micro-battery such as a portion of the micro-battery 102, the micro-battery 104, the device 200, the micro-battery 302 and/or the micro-battery 304.

Figure 9A:
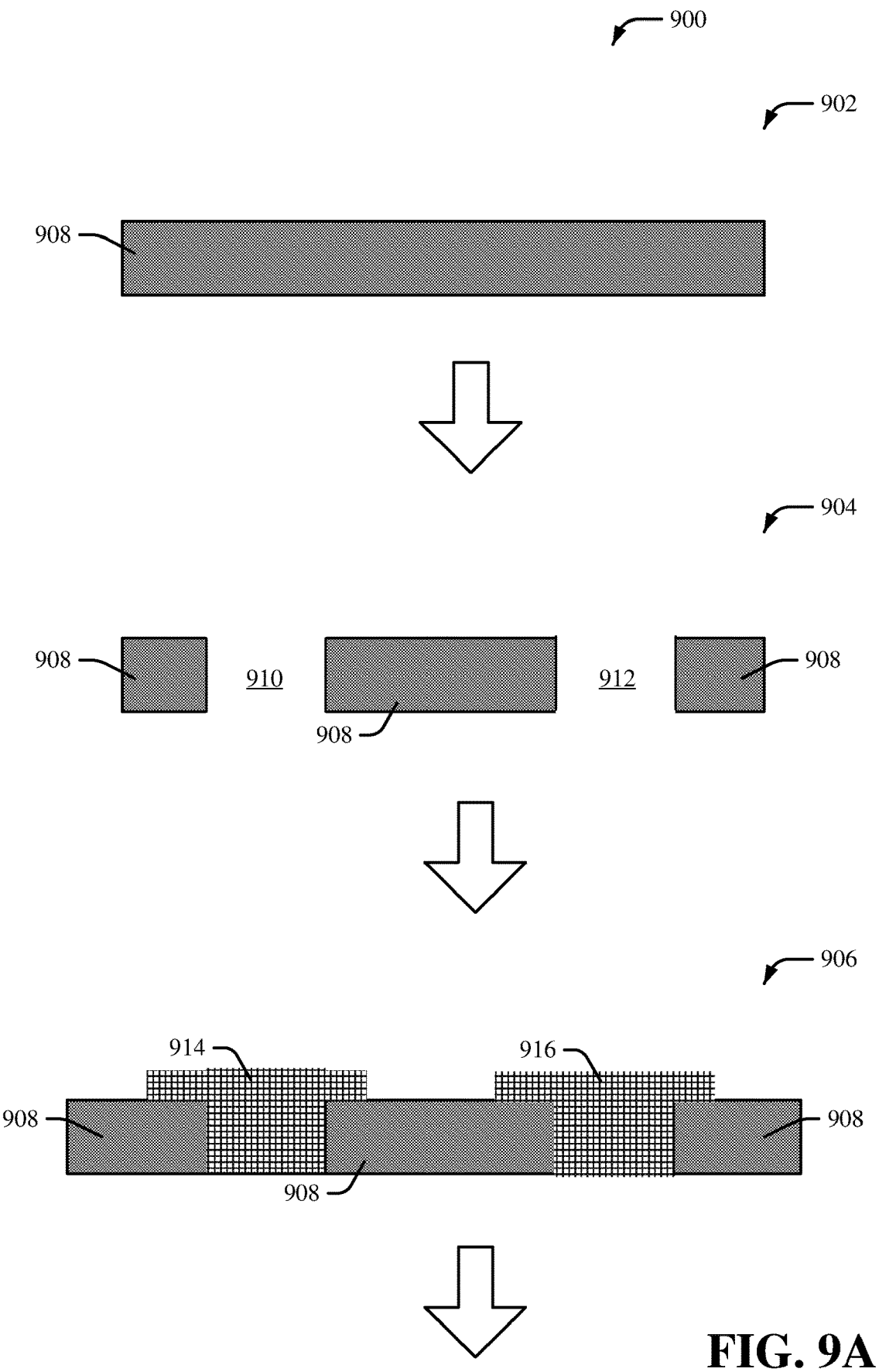
FIG. 9A illustrates an example, non-limiting process associated with fabricating a sandwich-parallel micro-battery in accordance with one or more embodiments described herein.
Figure 9B:
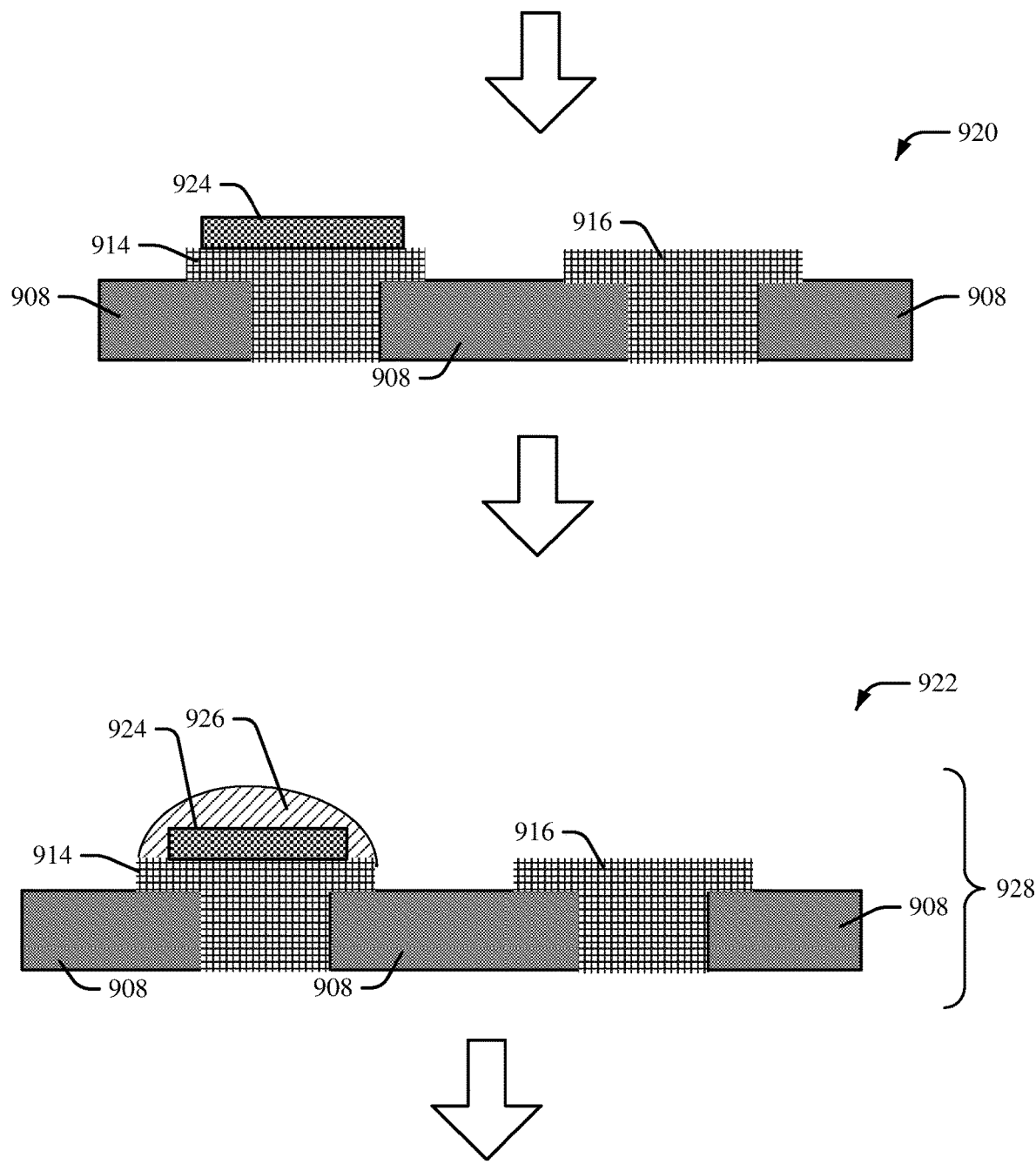
FIG. 9B further illustrates the example, non-limiting process associated with fabricating a sandwich-parallel micro-battery in accordance with one or more embodiments described herein.
Figure 9C:
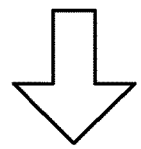
FIG. 9C further illustrates the example, non-limiting process associated with fabricating a sandwich-parallel micro-battery in accordance with one or more embodiments described herein.
Figure 9C:
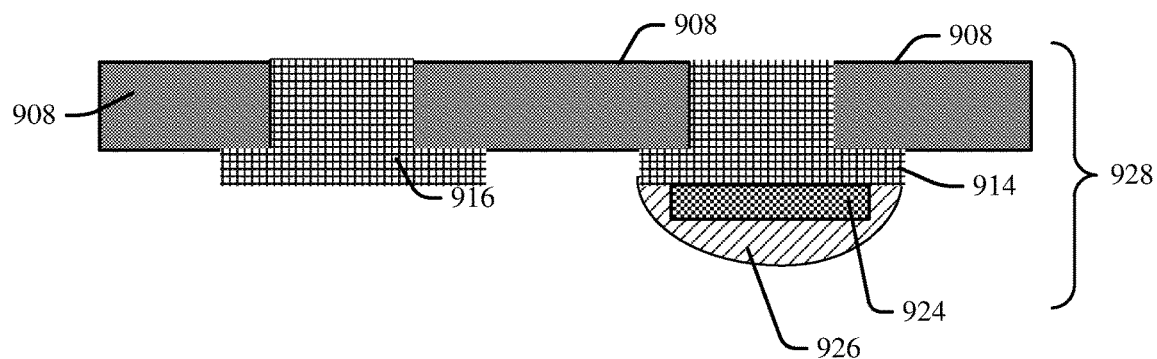
Figure 9C:
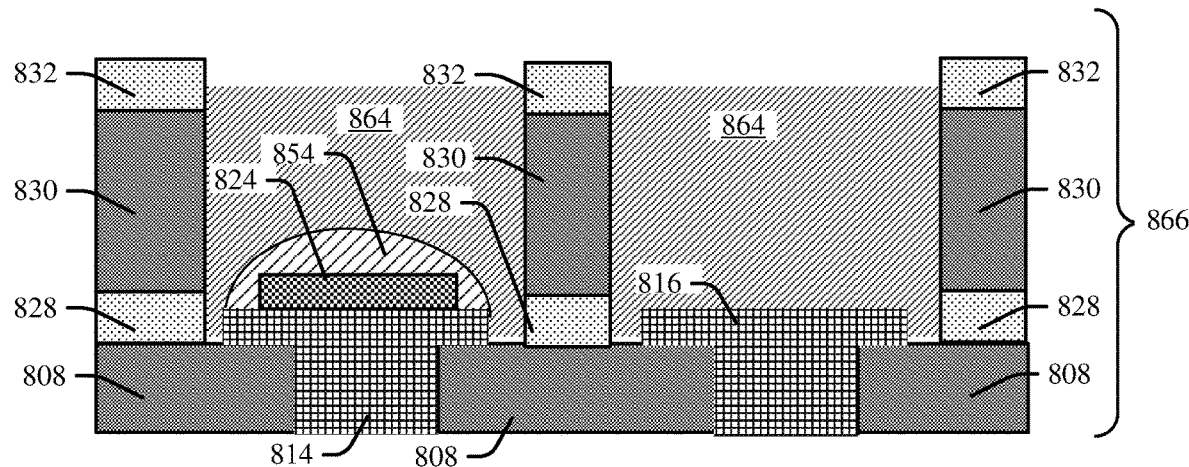

FIG. 9A, FIG. 9B and FIG. 9C pictorially depict an example process 900 for fabricating at least a portion of a micro-battery in accordance with one or more embodiments described herein. Repetitive description of like elements employed in other embodiments described herein is omitted for sake of brevity.

With reference to FIG. 9A, presented is a device structure step 902, a device structure step 904 and a device structure step 906. The device structure step 902 can include a substrate 908. The substrate 908 can be, for example, a flexible substrate. For example, the substrate 908 can be a flexible plastic substrate, a flexible glass substrate, or a flexible silicon substrate. In one example, the substrate 908 can be an ultraviolet transparent flexible substrate. In another example, the substrate 908 can be a polyethylene naphthalate substrate. In yet another example, the substrate 908 can be a polyethylene terephthalate substrate. In a non-limiting example, a thickness of the substrate 908 can be between 10 µm and 50 µm. The device structure step 904 can include the substrate 908. In an aspect, an opening 910 and/or an opening 912 can be formed in the substrate 908. For example, the substrate 908 can be mechanically drilled to form the opening 910 and/or the opening 912. In another example, the substrate 908 can be laser drilled to form the opening 910 and/or the opening 912. The device structure step 904 can include the substrate 908, ink material 914 and/or ink material 916. The ink material 914 can be, for example, a carbon ink material. Furthermore, the ink material 914 can be a carbon collector. The ink material 916 can also be, for example, a carbon ink material. Furthermore, the ink material 916 can be a carbon collector. In an aspect, the ink material 914 can be formed in the opening 910 and/or the ink material 916 can be formed in the opening 912. In an embodiment, the ink material 914 can be formed in the opening 910 and/or the ink material 916 can be formed in the opening 912 via stencil printing. In another embodiment, the ink material 914 can be formed in the opening 910 and/or the ink material 916 can be formed in the opening 912 via dispensing of carbon ink.

With reference to FIG. 9B, presented is a device structure step 920 and a device structure step 922. The device structure step 920 can be performed following the device structure step 906 shown in FIG. 9A. The device structure step 920 can include the substrate 908, the ink material 914, the ink material 916 and/or a conductive layer 924. The conductive layer 924 can be deposited, for example, on the ink material 914. In an example, the conductive layer 924 can be a zinc foil layer. In a non-limiting example, a thickness of the conductive layer 924 can be between 1 µm and 10 µm. In an aspect, the conductive layer 924 can be an anode material. The device structure step 922 can include the substrate 908, the ink material 914, the ink material 916, the conductive layer 924 and/or hydrogel material 926. The hydrogel material 926 can be dispensed onto the conductive layer 924. Furthermore, the hydrogel material 926 can be dispensed on a portion of the ink material 914. The hydrogel material 926 can be a liquid and/or a gel that comprises one or more polymeric materials. For example, the hydrogel material 926 can be water-soluble polymer (e.g., a cellulose ether) such as a water-soluble methylcellulose polymer, a water-soluble hydroxypropyl methylcellulose polymer, or another type of water-soluble polymer. In another example, the hydrogel material 926 can be a photo-initiated and/or an ultraviolet light-initiated gel such as Polyethylene (glycol) Diacrylate. In yet another example, the hydrogel material 926 can be a zinc chloride hydrogel. In an embodiment, the device structure step 922 can form a device structure 928. The device structure 928 can form a portion of a micro-battery such as a portion of the micro-battery 102, the micro-battery 104, the device 200, the micro-battery 302 and/or the micro-battery 304.

With reference to FIG. 9C, presented is a device structure step 930. The device structure step 930 can be performed following the device structure step 922 shown in FIG. 9B. The device structure step 930 can include the device structure 928 and the device structure 866. The device structure 928 can include the substrate 908, the ink material 914, the ink material 916, the conductive layer 924 and/or the hydrogel material 926. The device structure 866 can include the substrate 808, the ink material 814, the ink material 816, the conductive layer 824, the adhesive layer 828, the core layer 830, the adhesive layer 832, the hydrogel material 854 and/or the paste material 856. In an embodiment, the device structure 928 can be attached to the device structure 866. For instance, the device structure 928 can be attached to the device structure 866 to form a micro-battery. In an aspect, the substrate 908 of the device structure 928 can be deposited onto the adhesive layer 832 of the device structure 866. In an embodiment, side bonding, ultraviolet curing, and/or a compression process can be performed to facilitate attaching the substrate 908 of the device structure 928 to the adhesive layer 832 of the device structure 866. In certain embodiments, the substrate 908 of the device structure 928 can be bonded to the adhesive layer 832 of the device structure 866 at a particular temperature (e.g., between 80° C. and 120° C.). For example, in certain embodiments, the adhesive layer 832 of the device structure 866 can be a thermal cure adhesive.

Figure 10:
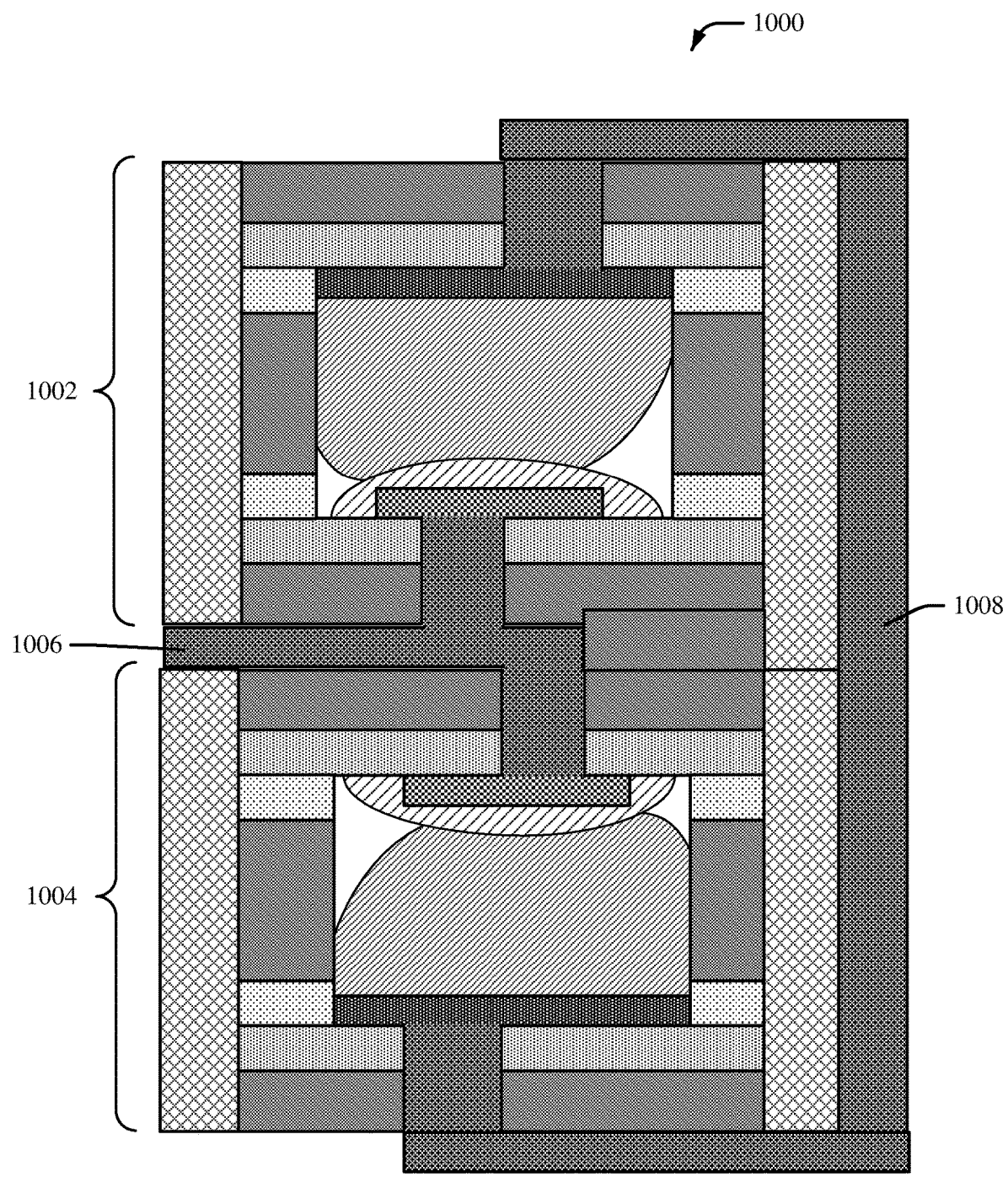
FIG. 10 illustrates yet another example, non-limiting device in accordance with one or more embodiments described herein.

FIG. 10 illustrates an example, non-limiting device 1000 in accordance with one or more embodiments described herein. Repetitive description of like elements employed in other embodiments described herein is omitted for sake of brevity.

The device 1000 includes a device 1002 and a device 1004. The device 1002 can be a micro-battery. Furthermore, the device 1004 can be a micro-battery. For example, the device 1002 and/or the device 1004 can correspond to the device 200. The device 1002 can include one or more substrates, one or more curable adhesive layers, one or more adhesive layers, one or more core layers, one or more conductive layers, paste material and/or a hydrogel material. Additionally, the device 1004 can include one or more substrates, one or more curable adhesive layers, one or more adhesive layers, one or more core layers, one or more conductive layers, paste material and/or a hydrogel material. In an embodiment, a conductive contact 1006 can electrically couple the device 1002 and the device 1004. For instance, the conductive contact 1006 can electrically couple a conductive layer of the device 1002 and a conductive layer of the device 1004. Additionally or alternatively, a conductive contact 1008 can electrically couple the device 1002 and the device 1004. For instance, the conductive contact 1008 can electrically couple a conductive layer of the device 1002 and a conductive layer of the device 1004. In an aspect, the device 1002 and the device 1004 can form a two-dimensional connection. For instance, the device 1002 and the device 1004 can be connected in a vertical, two-dimensional direction.

Figure 11:
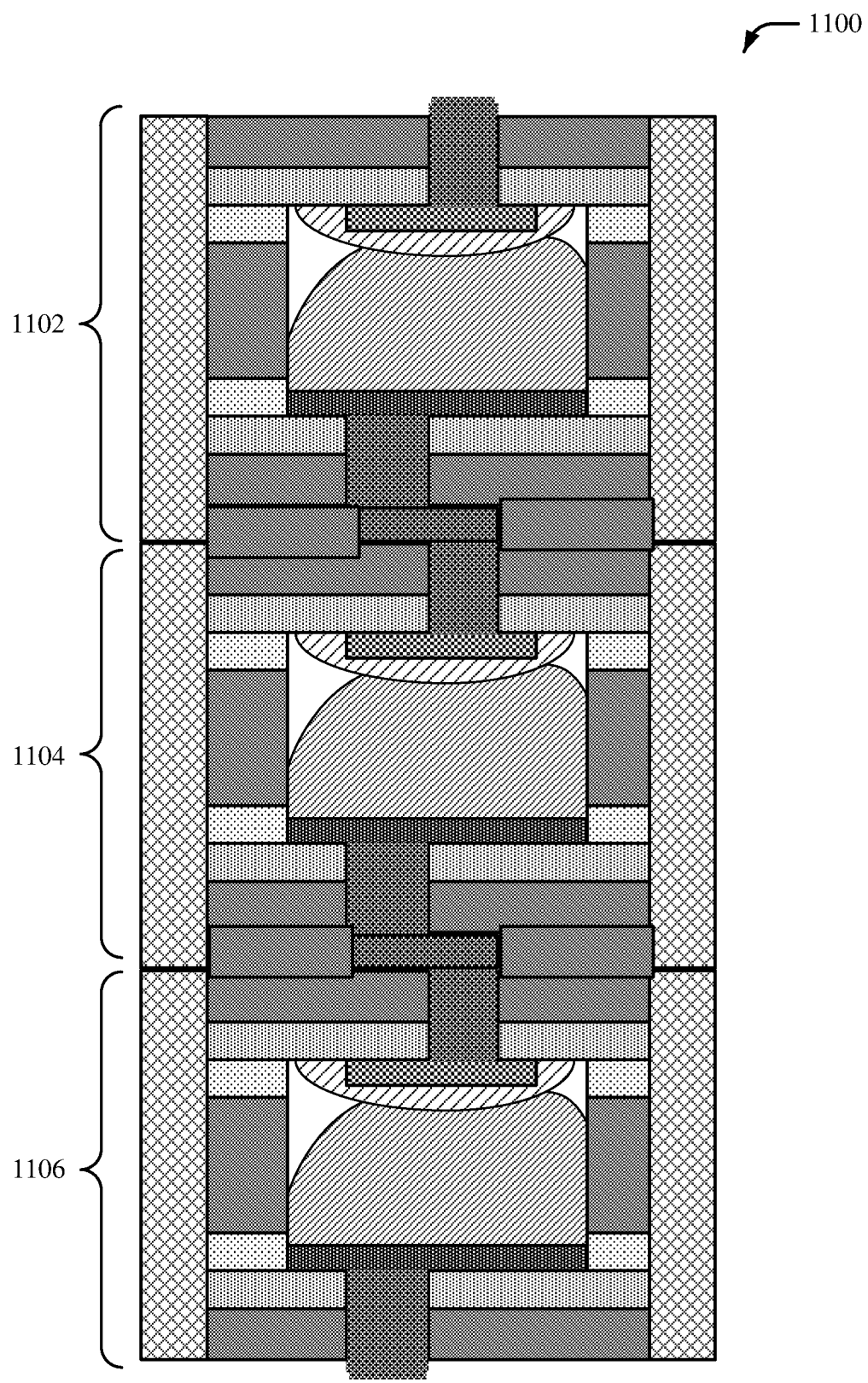
FIG. 11 illustrates yet another example, non-limiting device in accordance with one or more embodiments described herein.

FIG. 11 illustrates an example, non-limiting device 1100 in accordance with one or more embodiments described herein. Repetitive description of like elements employed in other embodiments described herein is omitted for sake of brevity.

The device 1100 includes a device 1102, a device 1104 and a device 1106. The device 1102, the device 1104 and/or the device 1106 can be a micro-battery. For example, the device 1102, the device 1104 and/or the device 1106 can correspond to the device 200. The device 1102 can include one or more substrates, one or more curable adhesive layers, one or more adhesive layers, one or more core layers, one or more conductive layers, paste material and/or a hydrogel material. Additionally, the device 1104 can include one or more substrates, one or more curable adhesive layers, one or more adhesive layers, one or more core layers, one or more conductive layers, paste material and/or a hydrogel material. Additionally, the device 1106 can include one or more substrates, one or more curable adhesive layers, one or more adhesive layers, one or more core layers, one or more conductive layers, paste material and/or a hydrogel material. In an embodiment, one or more conductive contacts can electrically couple the device 1102, the device 1104 and/or the device 1106. In an aspect, the device 1102, the device 1104 and the device 1106 can form a three-dimensional connection. For instance, the device 1102, the device 1104 and the device 1106 can be attached via three-dimensional stacking.

Figure 12:
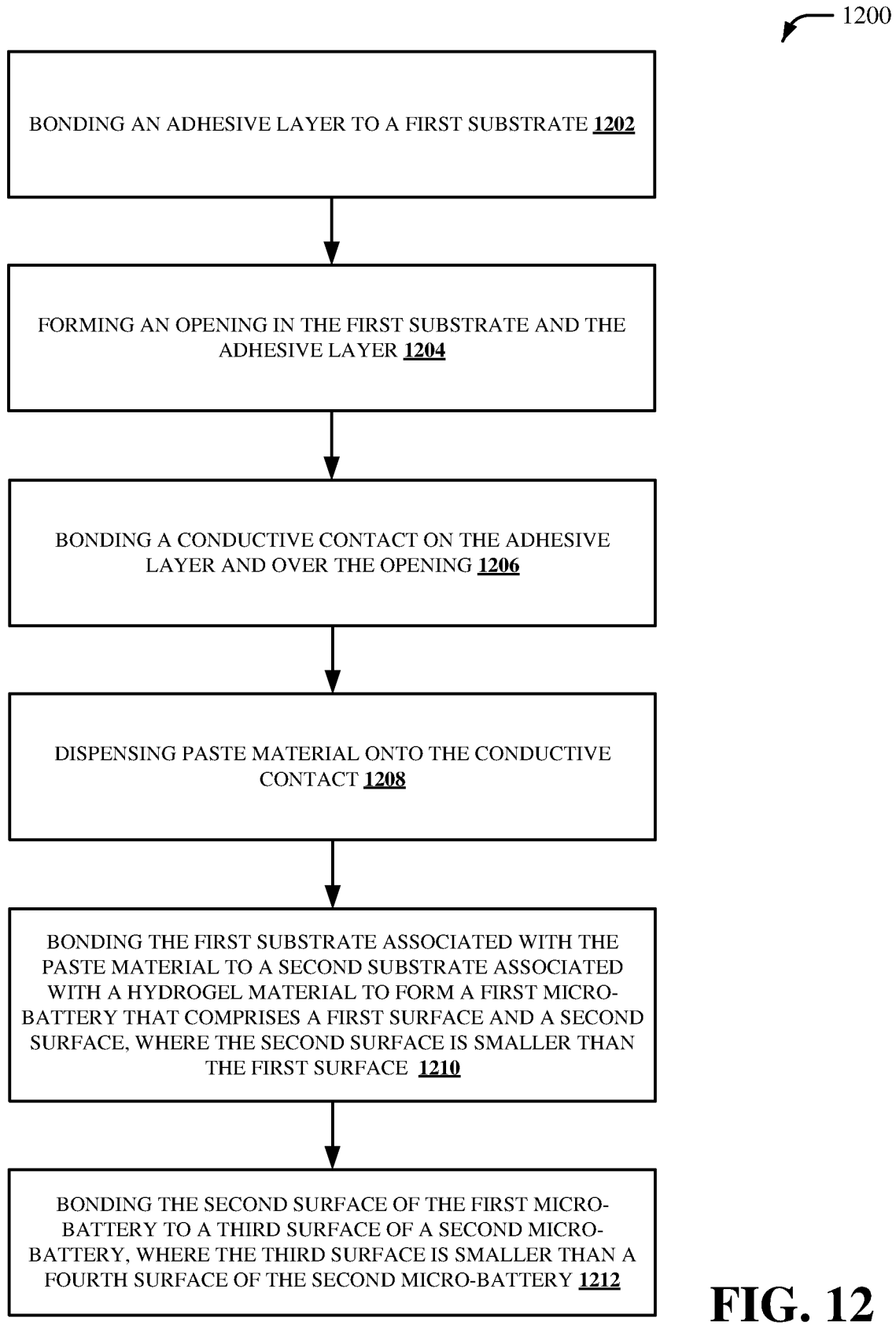
FIG. 12 illustrates a flow diagram of an example, non-limiting method that facilitates fabrication of a sandwich-parallel micro-battery in accordance with one or more embodiments described herein.

FIG. 12 illustrates a flow diagram of an example, non-limiting method 1200 that facilitates fabrication of a sandwich-parallel micro-battery in accordance with one or more embodiments described herein. Repetitive description of like elements employed in other embodiments described herein is omitted for sake of brevity.

At 1202, an adhesive layer is bonded to a first substrate. At 1204, an opening is formed in the first substrate and the adhesive layer. At 1206, a conductive contact is bonded on the adhesive layer and over the opening. At 1208, paste material is dispensed onto the conductive contact. At 1210, the first substrate associated with the paste material is bonded to a second substrate associated with a hydrogel material to form a first micro-battery that comprises a first surface and a second surface, where the second surface is smaller than the first surface. At 1212, the second surface of the first micro-battery is bonded to a third surface of a second micro-battery, where the third surface is smaller than a fourth surface of the second micro-battery. In certain embodiments, the method 1200 can include bonding an adhesive layer to the second substrate. Additionally or alternatively, the method 1200 can include forming an opening in the second substrate and the adhesive layer. Additionally or alternatively, the method 1200 can include bonding a conductive contact on the adhesive layer and over the opening. Additionally or alternatively, the method 1200 can include dispensing the hydrogel material onto the conductive contact. In certain embodiments, the bonding the second surface of the first micro-battery to the third surface of the second micro-battery can facilitate improved performance for the first micro-battery and the second micro-battery.

For simplicity of explanation, the method 1200 is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the method 1200 in accordance with the disclosed subject matter. In addition, those skilled in the art will understand and appreciate that the method 1200 could alternatively be represented as a series of interrelated states via a state diagram or events. The flowchart and block diagrams in the Figures illustrate the architecture, functionality, and operation of possible implementations of systems, methods, apparatuses and devices according to various embodiments of the present invention. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "electronic device" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, an electronic device and/or a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, electronic devices and/or processors can exploit nano-scale architectures such as, but not limited to, molecular and quantum-dot based transistors, switches and gates, in order to optimize space usage or enhance performance of user equipment. An electronic device and/or a processor can also be implemented as a combination of computing processing units.

What has been described above include mere examples of systems and methods. It is, of course, not possible to describe every conceivable combination of components or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
bonding a first substrate associated with a paste material to a second substrate associated with a hydrogel material to form a first micro-battery comprises a first surface and a second surface, wherein the second surface is smaller than the first surface;
bonding the second surface of the first micro-battery to a third surface of a second micro-battery, wherein the third surface is smaller than a fourth surface of the second micro-battery;
bonding an adhesive layer to the first substrate; and
forming an opening in the first substrate and the adhesive layer.

2. The method of claim 1, further comprising:
bonding a conductive contact on the adhesive layer and over the opening; and
dispensing the paste material onto the conductive contact.

3. The method of claim 1, further comprising:
bonding a second adhesive layer to the second substrate; and
forming a second opening in the second substrate and the second adhesive layer.

4. The method of claim 3, further comprising:
bonding a conductive contact on the second adhesive layer and over the second opening; and
dispensing the hydrogel material onto the conductive contact.

5. The method of claim 1, wherein the bonding the second surface of the first micro-battery to the third surface of the second micro-battery facilitates improved performance for the first micro-battery and the second micro-battery.

* * * * *